US012422257B1

(12) United States Patent
Boshoff et al.

(10) Patent No.: US 12,422,257 B1
(45) Date of Patent: Sep. 23, 2025

(54) FIDUCIAL ALIGNMENT DEVICE

(71) Applicant: Amazon Technologies, Inc., Seattle, WA (US)

(72) Inventors: Willem Hendrik Boshoff, Bristol (GB); Christopher James Breitfeller, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 387 days.

(21) Appl. No.: 18/121,733

(22) Filed: Mar. 15, 2023

(51) Int. Cl.
    *G01C 15/00* (2006.01)
(52) U.S. Cl.
    CPC .................. *G01C 15/004* (2013.01)
(58) Field of Classification Search
    CPC .............. G01C 15/02; G01C 15/004
    USPC ........................................ 33/286
    See application file for complete search history.

(56) References Cited

U.S. PATENT DOCUMENTS

| | | | | |
|---|---|---|---|---|
| 5,469,301 A * | 11/1995 | Graham | .................. | G01C 15/02 359/831 |
| 5,589,939 A * | 12/1996 | Kitajima | .............. | G01C 15/004 356/400 |
| 5,748,306 A * | 5/1998 | Louis | .................... | G01B 11/26 356/153 |
| 6,202,312 B1 * | 3/2001 | Rando | .................. | G01C 15/004 356/138 |
| 6,931,737 B1 * | 8/2005 | Liao | ...................... | G01C 15/004 33/286 |
| 6,938,350 B1 * | 9/2005 | Hersey | ................. | G01C 15/004 33/286 |
| 7,784,192 B2 * | 8/2010 | Jancic | ....................... | F41G 1/35 33/286 |
| 7,992,310 B2 * | 8/2011 | Litvin | .................. | G01C 15/004 33/286 |
| 8,061,046 B2 * | 11/2011 | Stefan | .................... | F16M 11/18 33/290 |
| 8,104,186 B2 * | 1/2012 | Raschella | ................. | F41G 1/35 42/114 |
| 9,110,308 B2 * | 8/2015 | Zimmermann | ...... | G02B 27/648 |
| 9,846,034 B2 * | 12/2017 | Hill | ....................... | G01C 15/004 |
| 10,006,768 B2 * | 6/2018 | Spaulding | ............ | G01C 15/002 |
| 10,066,939 B2 * | 9/2018 | Lee | ...................... | G01C 15/004 |
| 11,125,877 B2 * | 9/2021 | McGill | ................ | G01C 15/008 |
| 11,300,410 B2 * | 4/2022 | Hill | ....................... | G01C 15/002 |
| 11,320,264 B2 * | 5/2022 | Melton | ................ | G01C 15/105 |
| 2005/0198845 A1 * | 9/2005 | Robinson | ............. | G01C 15/004 33/227 |
| 2010/0122466 A1 * | 5/2010 | Hemingway | ........ | G01C 15/004 33/290 |

(Continued)

*Primary Examiner* — George B Bennett

(74) *Attorney, Agent, or Firm* — Eversheds Sutherland (US) LLP

(57) ABSTRACT

A device includes a housing, a first coupler coupled to the housing, and a second coupler coupled to the housing. The first coupler has a first channel and the second coupler has a second channel. The device further includes a first laser configured to output a first laser beam in a first direction, a second laser disposed at least partially within the first channel of the first coupler and configured to output a second laser beam in a second direction different than the first direction, and a third laser disposed at least partially within the second channel of the second coupler and configured to output a third laser beam in a third direction different than the second direction.

20 Claims, 22 Drawing Sheets

(56) References Cited

U.S. PATENT DOCUMENTS

| | | | |
|---|---|---|---|
| 2013/0167386 A1* | 7/2013 | Peng | G01C 15/004 33/290 |
| 2020/0182616 A1* | 6/2020 | Zhuang | G01C 15/004 |
| 2022/0026239 A1* | 1/2022 | Lu | G01C 15/004 |
| 2022/0155066 A1* | 5/2022 | Selvaraj | G01C 15/02 |
| 2022/0170743 A1* | 6/2022 | Gould | G01C 9/02 |
| 2023/0358997 A1* | 11/2023 | Rothbucher | G01C 15/02 |
| 2024/0210172 A1* | 6/2024 | Moren | G01C 15/004 |

* cited by examiner

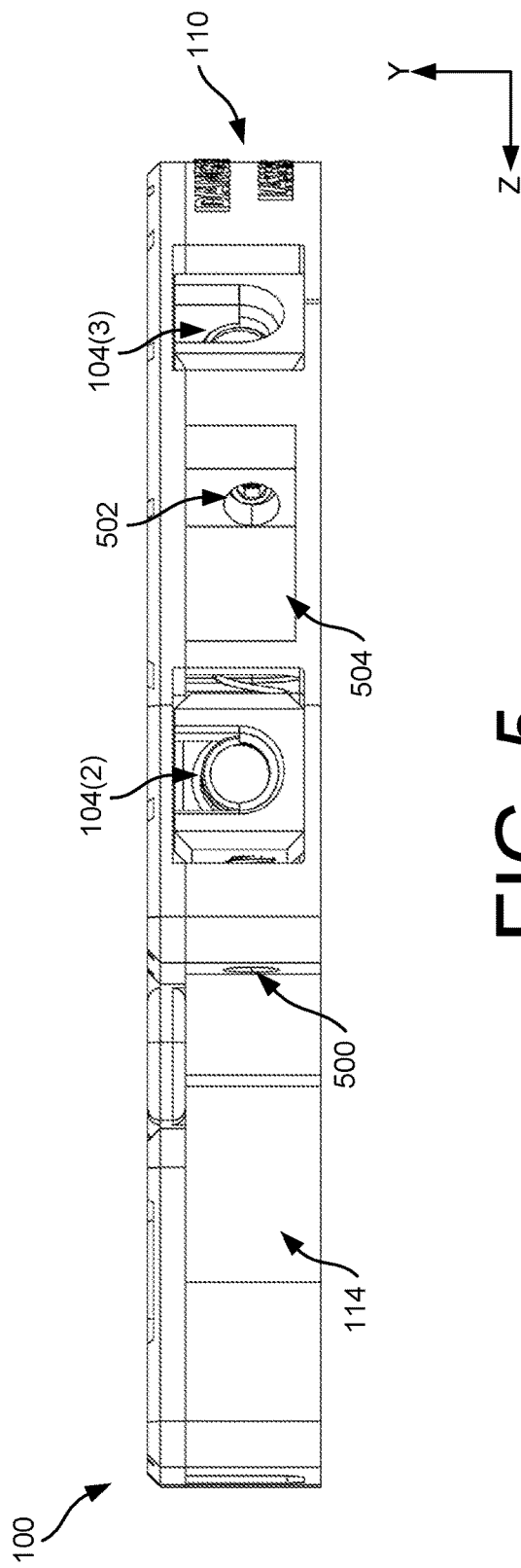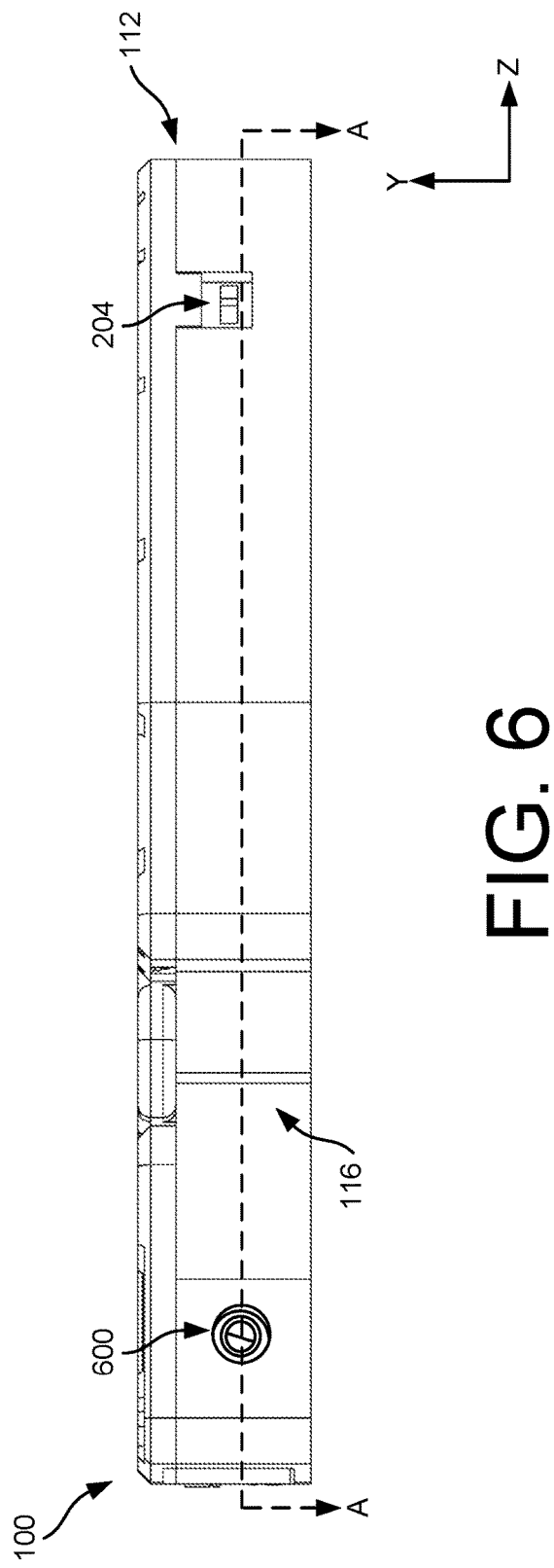
FIG. 5
FIG. 6

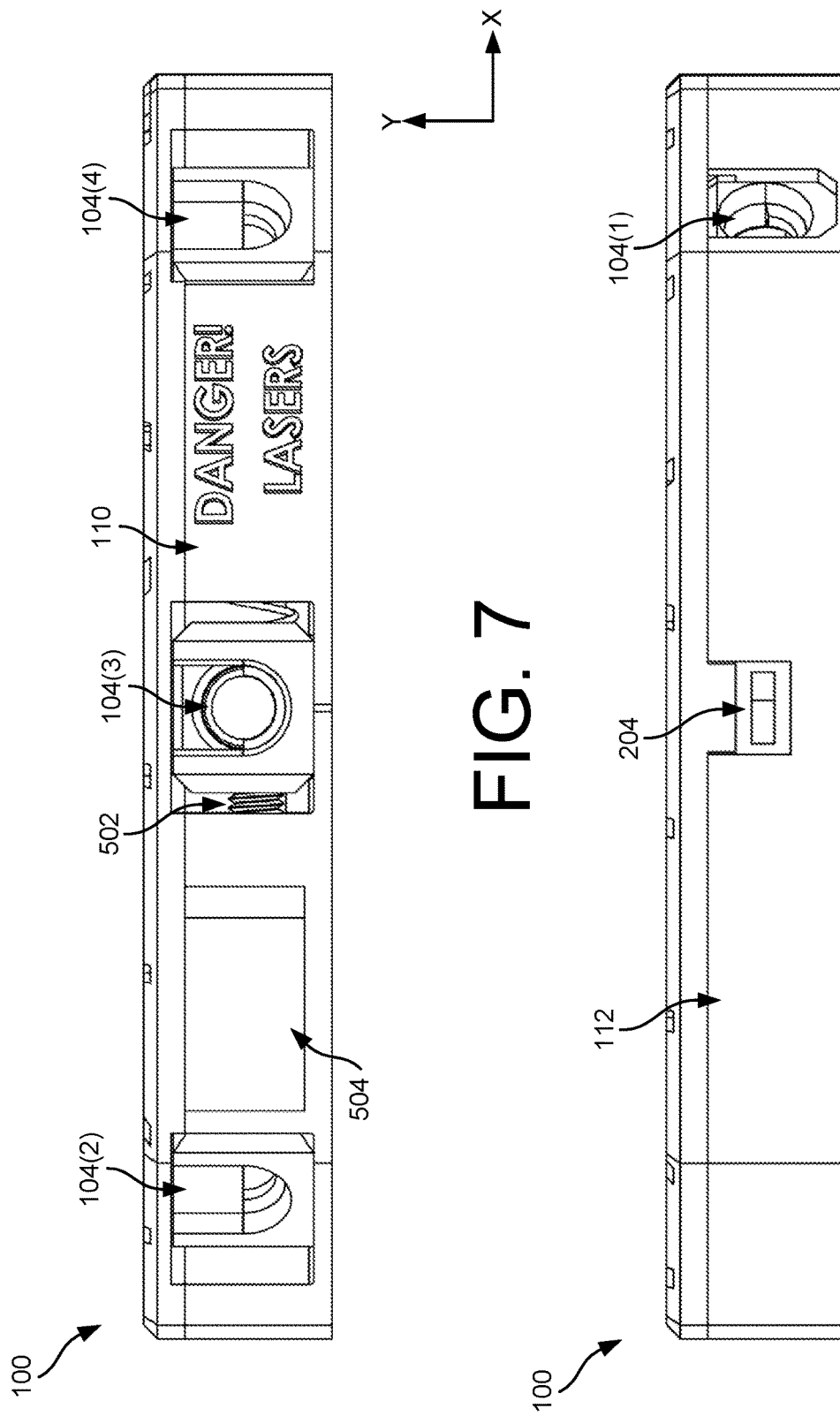
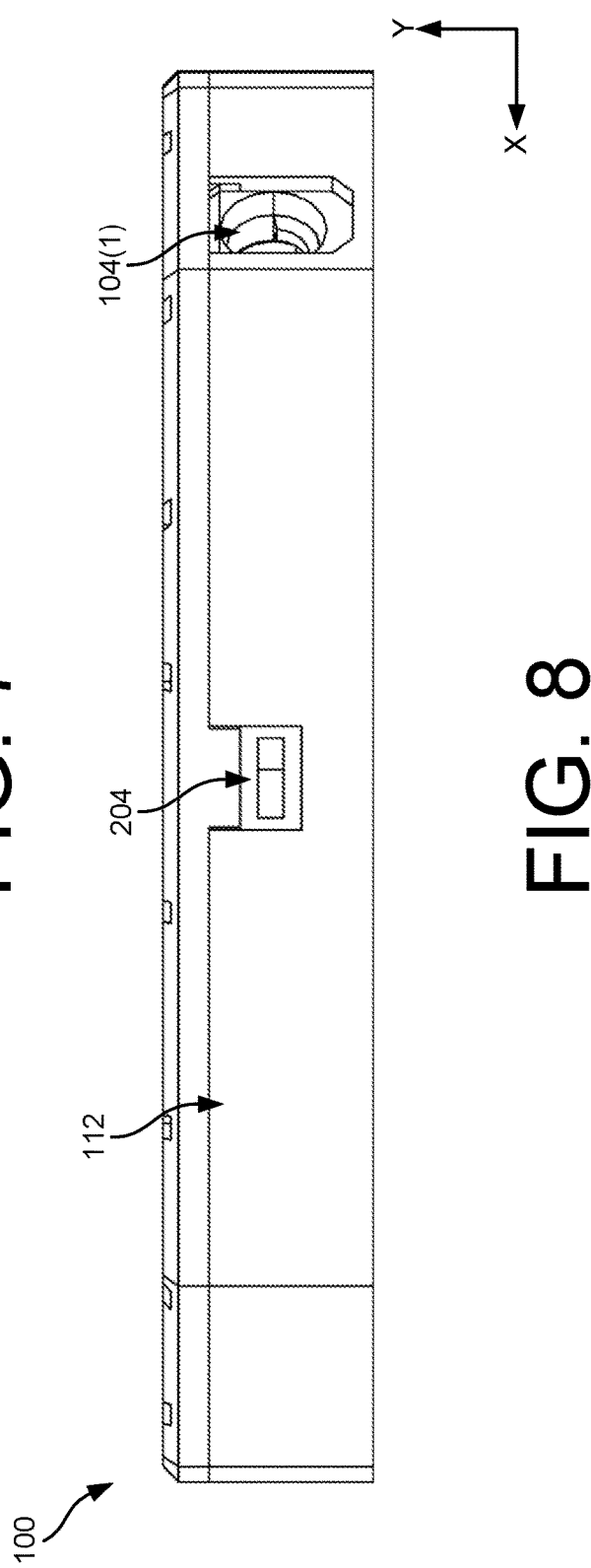
FIG. 7
FIG. 8

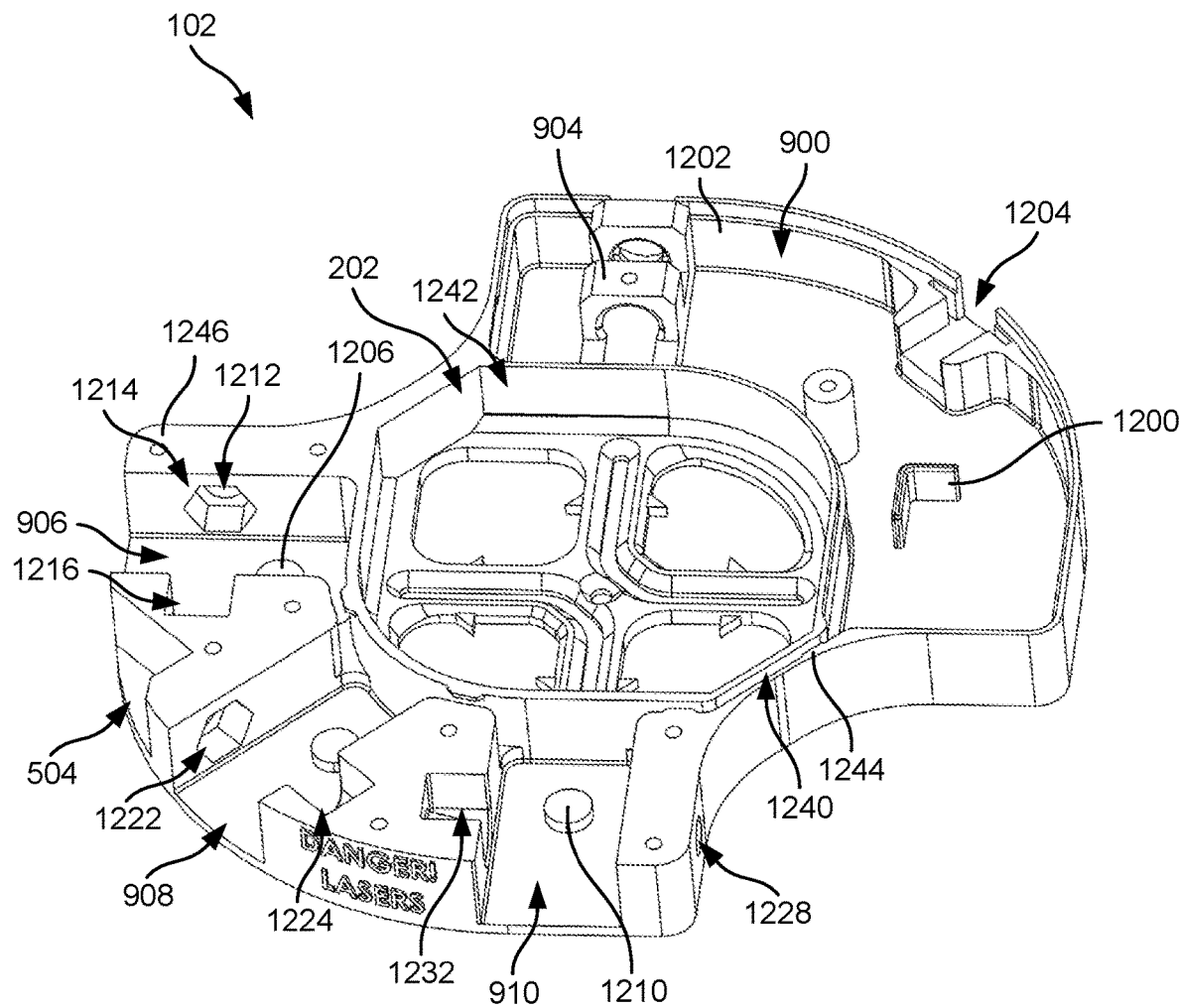
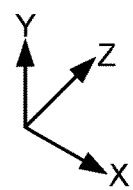
FIG. 12B

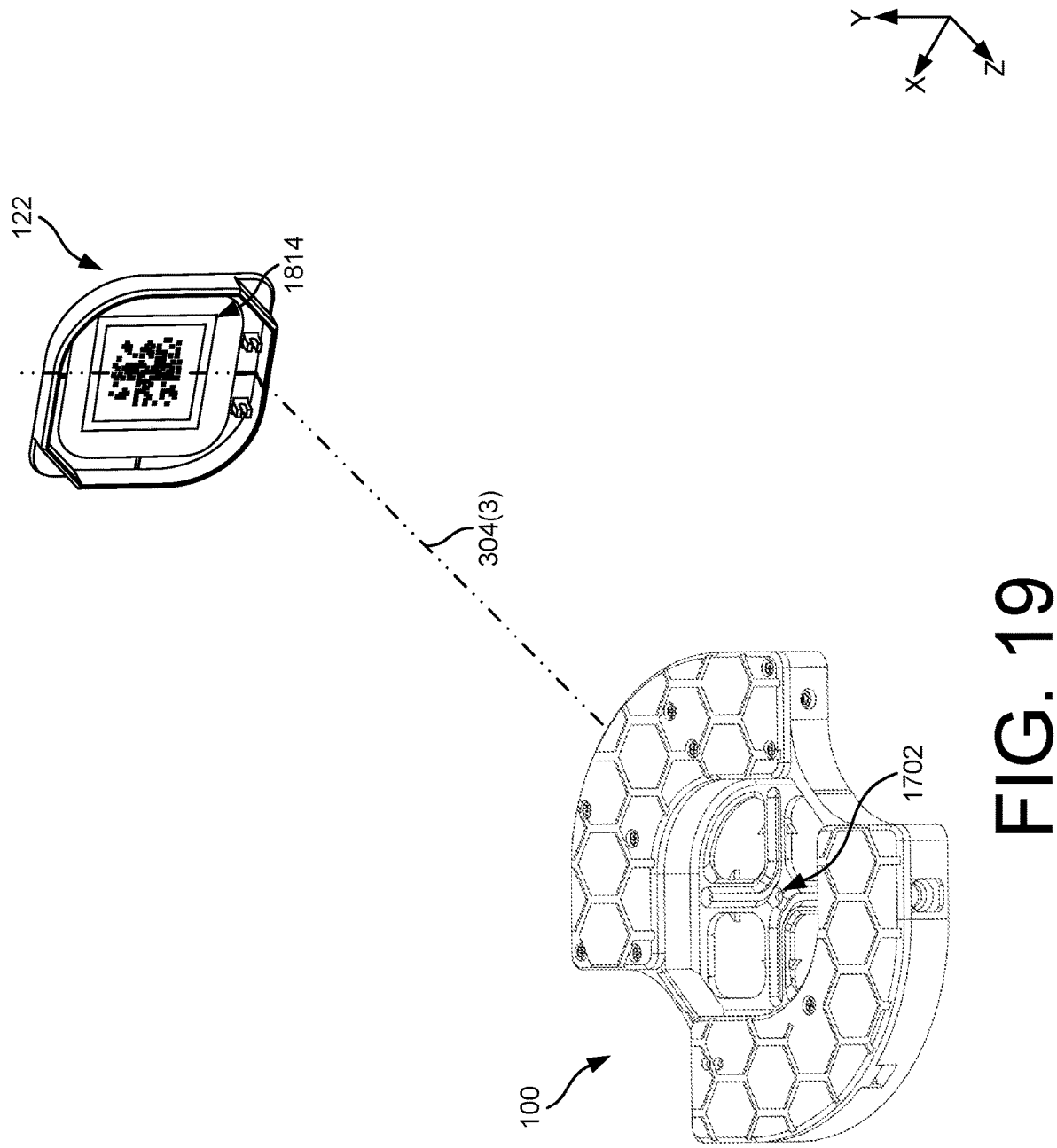

FIDUCIAL ALIGNMENT DEVICE

BACKGROUND

Modern environments, such as warehouses, distribution centers, airports, and manufacturing facilities, include robots that move items, containers, or other goods. For example, within a warehouse, robots may move shelving units from a storage location to a shipping location (e.g., for items to be boxed and shipped). To travel between locations, the robots may include sensor(s), such as camera(s), that image fiducials disposed about the warehouse. Overtime, the fiducials may become worn or damaged, thereby requiring replacement. Unfortunately, replacing the fiducials is often a tedious and time consuming process. For example, if the fiducials are inaccurately placed, the robots may be unable to image the fiducials or accurately traverse about an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIG. 5 illustrates a planar view of a third side of the device of FIGS. 1A and 1B, according to an example of the present disclosure.

FIG. 6 illustrates a planar view of a fourth side of the device of FIGS. 1A and 1B, according to an example of the present disclosure.

FIG. 7 illustrates a planar view of a fifth side of the device of FIGS. 1A and 1B, according to an example of the present disclosure.

FIG. 8 illustrates a planar view of a sixth side of the device of FIGS. 1A and 1B, according to an example of the present disclosure.

FIGS. 12A-12C illustrate an example housing of the device of FIGS. 1A and 1B, according to an example of the present disclosure.

FIG. 19 illustrates an example use of the device of FIGS. 1A and 1B, according to an example of the present disclosure.

DETAILED DESCRIPTION

Figure 1A:
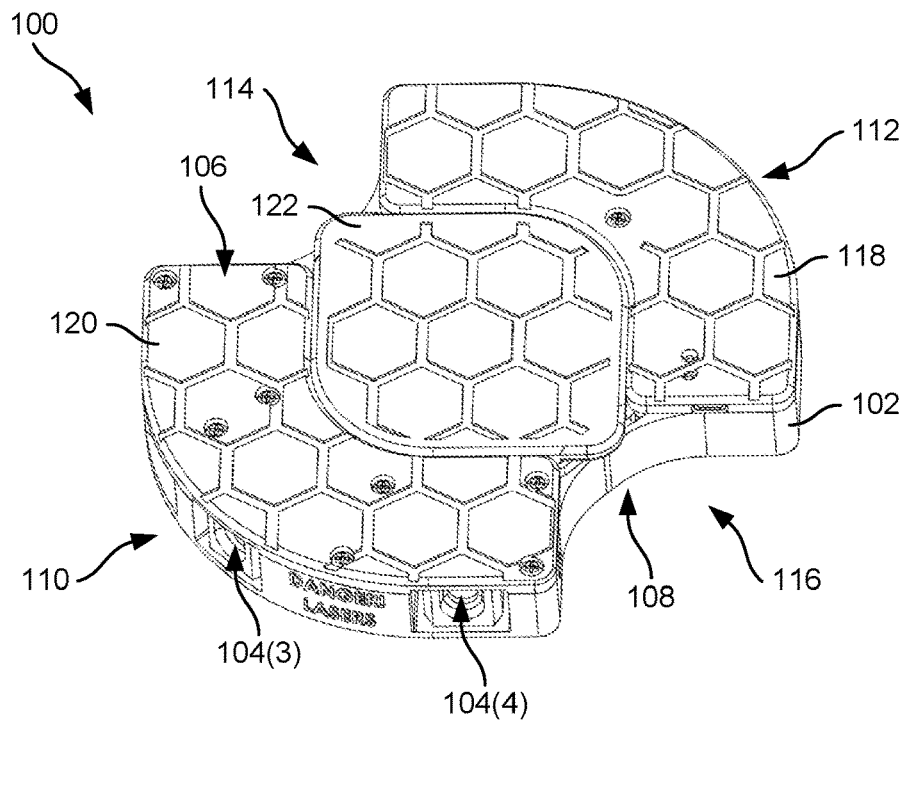
FIGS. 1A and 1B illustrate perspective views of a first side an example device, according to an example of the present disclosure.

This application is directed, at least in part, to a device (e.g., tool, apparatus, etc.) that may be used for accurately placing fiducials within an environment. For example, within the environment, fiducials may be placed on a ground surface (e.g., floor) and robots that travel about the environment may image the fiducials. The accurate placement of the fiducials permits the robots to travel between locations within the environment. In some instances, the device may include one or more lasers that output laser beams aligned with other fiducials within the environment. For example, aligning the laser beams with other fiducials in the environment may accurately position the device within the environment in order to accurately align a current fiducial being replaced or installed. In some instances, the device includes features that allow for an operator of the device to scribe (e.g., mark) an area on the ground surface at which the fiducial is to be placed. For example, an alignment mechanism may include channels that permit the operator to scribe the ground surface. Once scribed, the device may be removed, and the operator may align the fiducials with the markings on the ground surface. In addition to using the device to place new fiducials, the device may be used to check (e.g., confirm) whether previously installed fiducials are accurately placed, or are in need of replacement. The device may therefore assist in the accurate placement and checking of fiducials throughout the environment, and may decrease an amount of time to replace, confirm, or otherwise install the fiducials.

The environment may include any number of fiducials placed about the ground surface. In some instances, the fiducials are arranged in rows and columns, in a grid-like fashion. For example, along a length of the ground surface, the fiducials may be disposed along rows, and along a width of the ground surface, the fiducials may be disposed along one or more columns. In some instances, the rows and the columns may be arranged orthogonal and/or parallel to one another. The placement of the fiducials permits the robots imaging the fiducials to localize themselves for traveling between locations within the environment. For example, when traveling between a first location and a second location, the robot may image the fiducial to determine a direction of travel, where to turn, where to stop, and so forth. In some instances, the fiducials represent square stickers having a QR code that are applied to the ground surface.

In some instances, the device may represent a handheld device capable of being carried by the operator. In use, the device is configured to rest on the ground surface, and lasers output laser beams in directions external to the device. For example, in some instances, the lasers (e.g., line laser) may include at least a first laser, a second laser, a third laser, and a fourth laser. The lasers output respective laser beams, and the laser beams may be aligned with other fiducials disposed about the environment. By aligning the laser beams with other fiducials in the environment, the device may be placed at a location corresponding a current placement of a fiducial being replaced, installed, etc.

In some instances, the lasers are configured to output laser beams at a certain orientations. The orientations of the laser beams serve to align the device with the adjacent fiducials in order to accurately place the fiducials. For example, the first laser may output a first laser beam that is disposed at 90 degrees relative to a second laser beam of the second laser. The third laser may output a third laser beam that is disposed at 45 degrees relative to the second laser beam of the second laser. Additionally, the fourth laser may output a fourth laser beam that is disposed at 45 degrees relative to the third laser beam of the third laser. In some instances, the fourth laser beam output by the fourth laser is disposed at 90 degrees relative to the second laser beam output by the second laser. Additionally, the first laser beam output by the first laser may be disposed at 180 degrees relative to the fourth laser beam output by the fourth laser. As such, the lasers may be configured to output laser beams in different directions outward from the device.

The lasers may be disposed within a housing that orients the laser beams at their respective angles. In some instances, the first laser is disposed within a first cavity of the housing, while the second laser, the third laser, and the fourth laser are disposed within a second cavity, the third cavity, and the fourth cavity of the device, respectively. The device may also include calibration mechanisms that accurately orient the laser beams output by the lasers. For example, after manufacturing the device, the laser beams may be calibrated to their respective orientations. In some instances, the calibration mechanisms include fasteners (e.g., screws) that are capable of being tightened and loosened to adjust an orientation of the lasers, and therefore, the laser beams. As an example, to orient the second laser beam at 90 degrees from the first laser beam, the calibration mechanisms may be used.

In some instances, the calibration mechanisms are used to calibrate the second laser beam, the third laser beam, and the fourth laser. For example, a first screw may be used to calibrate the second laser, a second screw may be used to calibrate the third laser, and a third screw may be used to calibrate the fourth laser. In some instances, the screws of the calibration mechanism may be manipulated until the second laser beam, the third laser beam, and the fourth laser beams are respectively oriented in relation to one another. In some instances, and as noted above, the lasers are disposed within cavities of the second housing, and biasing elements may engage the lasers. By tightening and loosening the screws, for example, the biasing elements may compress or extend to adjust the orientation of the lasers within the cavities, respectively.

The alignment mechanism may be disposed between the first cavity, and the second cavity, the third cavity, and the fourth cavity. The alignment mechanism may represent a structure having one or more channels, flanges, and so forth that are used to mark locations on the ground surface corresponding to the location at which the fiducial is to be placed. Additionally, the one or more channels, flanges, and so forth may be aligned with a fiducial already on the ground surface in order to align other fiducials disposed within rows or columns about the environment.

In some instances, the alignment mechanism may include channels that are capable of receiving a marker. When the laser beams are aligned with adjacent fiducials, a marker, for example, may be insertable into the channels to mark one or more locations location on the ground surface. The marked locations may be aligned with features of the fiducials in order to align the fiducial properly on the ground surface. For example, once the markings are made, the device may be removed and the fiducial may be aligned with the markings. More particularly, as noted above, the fiducials may represent square stickers. In some instances, the fiducials have a border disposed around a QR code. The border may also include markings (e.g., triangles) disposed along the sides of the border. These markings may be aligned with the markings scribed on the ground surface in order to accurately place the fiducial on the ground surface.

In some instances, the alignment mechanism includes two channels, such as a first channel and a second channel. The first channel may be used to mark locations on the floor corresponding to markings that are disposed on a first side and a second side of the border. The second channel may be used to mark locations on the floor corresponding to markings that are disposed on a third side and a fourth side of the border. The first side and the third side may be opposite sides, while the second side and the fourth side may be opposite sides. The first side may be oriented orthogonally to the second side and the fourth side, and parallel with the third side, while the third side may be oriented orthogonally to the second side and the fourth side. As such, using the two channels, two markings may be made on the ground surface, and the four markings of the fiducial may be correspondingly aligned with the two markings on the ground surface to accurately place the fiducial within the environment.

In addition to the channels, the alignment mechanism may include the tabs that align with a border of the fiducial. In some instances, the tabs may be disposed a structure of the alignment mechanism that forms the channels. For example, the tabs may be aligned with the border of a fiducial that resides on the ground surface. By aligning the tabs with the border, the device may be aligned on the fiducial and the laser beams emitted by the lasers may be oriented relative to the fiducial being installed, replaced, or confirmed. In doing so, the adjacent fiducials may be inspected to determine whether the adjacent fiducials, or the fiducial on which the device is disposed, are accurate.

To briefly illustrate the replacement of a fiducial, the fiducial may first be removed from the ground surface and the ground surface may be prepared (e.g., cleaned). The lasers may be turned on, and the laser beams output by the lasers may be respectively aligned with adjacent rows and/or columns of fiducials. During this process, the device may be moved on the ground surface in order to align the laser beams with the adjacent fiducials. In some instances, not all of the laser beams may be aligned with the fiducials of adjacent rows and/or columns. Once the laser beams are aligned, however, a location on the ground surface may be marked. This marking may indicate where the fiducial is to be placed. Thereafter, the device may be removed from the ground surface, or slid aside, and a fiducial may be installed on the ground surface using the marked locations. By aligning the fiducial with the marked locations, the fiducial may be properly positioned (e.g., aligned, oriented, etc.) within the environment.

In some instances, the device includes a calibration target that is capable of being placed through the environment for aligning the device. For example, the calibration target may stand upright on the ground surface. A laser beam output by one of the laser may be aligned with the calibration target in order to properly position the device. In some instances, the calibration target may removably couple to the device at a location between the first cavity and the second cavity, the third cavity, and the fourth cavity. For example, the calibration target may inserted into a pocket between the first cavity, the second cavity, the third cavity, and the fourth cavity, adjacent to the alignment mechanism.

The device may also include a central opening, on or as part of the alignment mechanism, for surveying points on the ground surface. For example, once the device is aligned (via the lasers) on adjacent fiducials, the central opening may be used to mark the ground surface. From there, the device may be reoriented about the marked point for determining whether other adjacent fiducials are aligned with the device. Accordingly, the device may be used to survey points on the ground surface for confirming or checking an alignment of the fiducials.

Although the above discussion is with regard to the device being used to place fiducials on the ground surface, the device may be used to install fiducials at other locations, such as walls, a ceiling, other objects/structures, and so forth. Additionally, although the fiducials are described as being square in shape, other shapes are envisioned. In such instances, the alignment mechanism and the device may be correspondingly configured.

The device may include a battery for powering components, such as the laser(s). The device may include a charging port (e.g., USB-C, micro USB, etc.) for recharging the battery. In some instances, the battery and/or the charging port are location on or within the first cavity. Additionally, although described as a charging port, the device may include connections for providing updates, debugging, and so forth. The device may include a button (e.g., switch) that turns the lasers on and off. In some instances, all of the lasers may be turned on and off at once, or certain lasers may be turned on while other lasers may be turned off. In some instances, the button that turns the lasers on and off is located on or within the first housing.

In some instances, the device may be placed on a robotic drive that traverses about the environment. The robotic drive may maneuver about the environment, while imaging the fiducials on the ground surface. Once over a fiducial, the robotic drive may align itself, and the laser beams emitted by the lasers may be emitted onto other fiducials within the environment (e.g., rows, columns, etc.). By emitting the laser beams, the device may be used to confirm whether the fiducials are accurately aligned within the environment. In some instances, personnel may observe the laser beams to determine whether the fiducials are aligned, or the device (or the robotic drive) may include components for determining whether the fiducials are aligned.

In some instances, to align the robotic drive on the fiducial, the robotic drive may be oriented parallel to indications on the fiducial. By aligning the robotic drive on the fiducial, the laser beams emitted by the lasers may be relative to the fiducial in order to determine whether the adjacent fiducials are aligned with the fiducial over which the robotic drive is disposed. In some instances, the robotic drive may maneuver about the environment to confirm the alignment of the fiducials in the environment.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

Figure 1B:
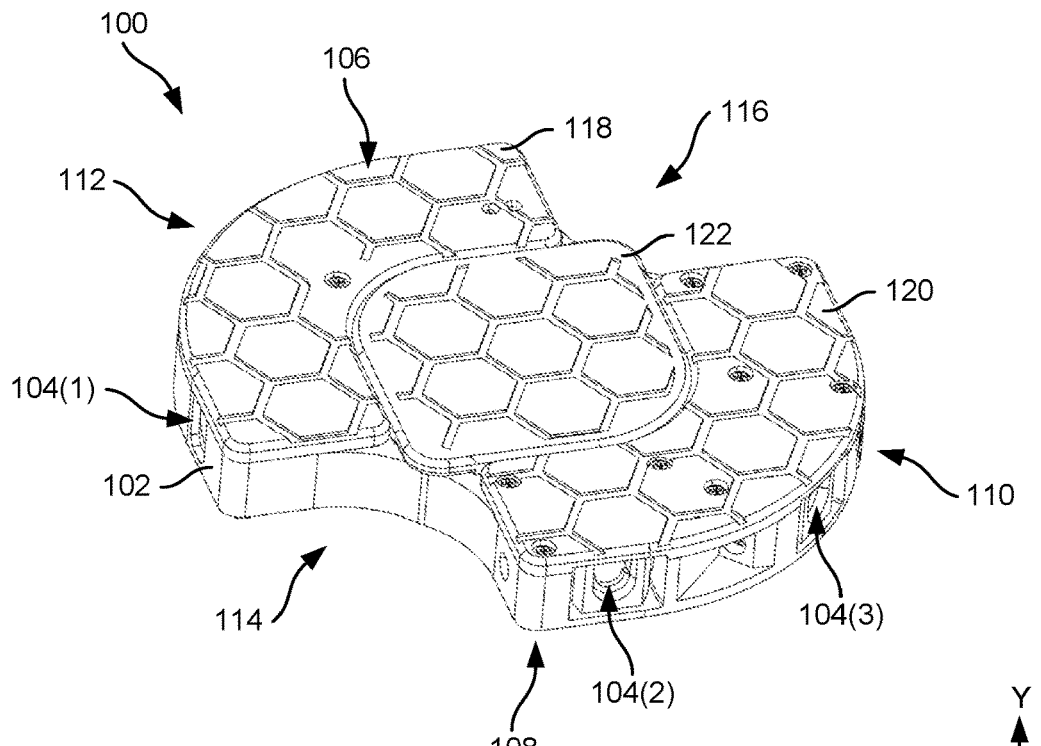

FIGS. 1A and 1B illustrate an example device 100 usable to align fiducials within an environment, according to an example of the present disclosure. The views shown in FIGS. 1A and 1B may illustrate top perspective views of the device 100.

In some instances, the device 100 includes a housing 102 configured to receive one or more lasers 104, such as a first laser 104(1), a second laser 104(2), a third laser 104(3), and a fourth laser 104(4). As will be explained herein, the housing 102 may define cavities that receive the lasers 104, respectively. Additionally, the lasers 104 may be oriented in respective directions relative to the housing 102. For example, the first laser 104(1) may be oriented in a first direction, the second laser 104(2) may be oriented in a second direction that is different than the first direction, the third laser 104(3) may be oriented in a third direction that is different than the second direction, and the fourth laser 104(4) may be oriented in a fourth direction that is different than the third direction. In some instances, the fourth direction may be opposite the first direction.

In some instances, the device 100 may include a top 106, a bottom 108 spaced apart from the top 106 (e.g., in the Y-direction), a front 110, a back 112 spaced apart from the front 110 (e.g., in the Z-direction), a first side 114, and a second side 116 spaced apart from the first side 114 (e.g., in the X-direction). In some instances, the first laser 104(1) may be arranged along the first side 114 and/or the back 112 of the device 100, the second laser 104(2) may be arranged along the first side 114 and/or the front 110, the third laser 104(3) may be arranged along the front 110, and/or the fourth laser 104(4) may be arranged along the second side 116 and/or the front 110. In use, the bottom 108 may rest on a ground surface (e.g., floor), while the top 106 may be spaced apart from the ground surface.

One or more covers couple to the housing 102 to enclose components of the device 100, such as the lasers 104. For example, the device 100 may include a first cover 118 and a second cover 120. The first laser 104(1) may reside within/beneath the first cover 118, while the second laser 104(2), the third laser 104(3), and the fourth laser 104(4) may reside within/beneath the second cover 120. In some instances, the first cover 118 and/or the second cover 120 include a honeycomb surface. The first cover 118 and/or the second cover 120 may couple to the housing 102 along the top 106, or may be disposed along the top 106 of the device 100.

The device 100 may further include a calibration tool 122 disposed between the first cover 118 and the second cover 120. As will be explained herein, the calibration tool 122 may reside within a pocket formed the housing 102. The calibration tool 122 may be removably coupled to the device 100, such as the housing 102. The calibration tool 122 may represent a target that is spaced apart from the device 100 for aligning the device 100 within an environment. For example, the calibration tool 122 may be placed on the ground surface and a laser beam emitted by one of the lasers 104 may be aligned with the calibration tool 122.

Figure 2A:
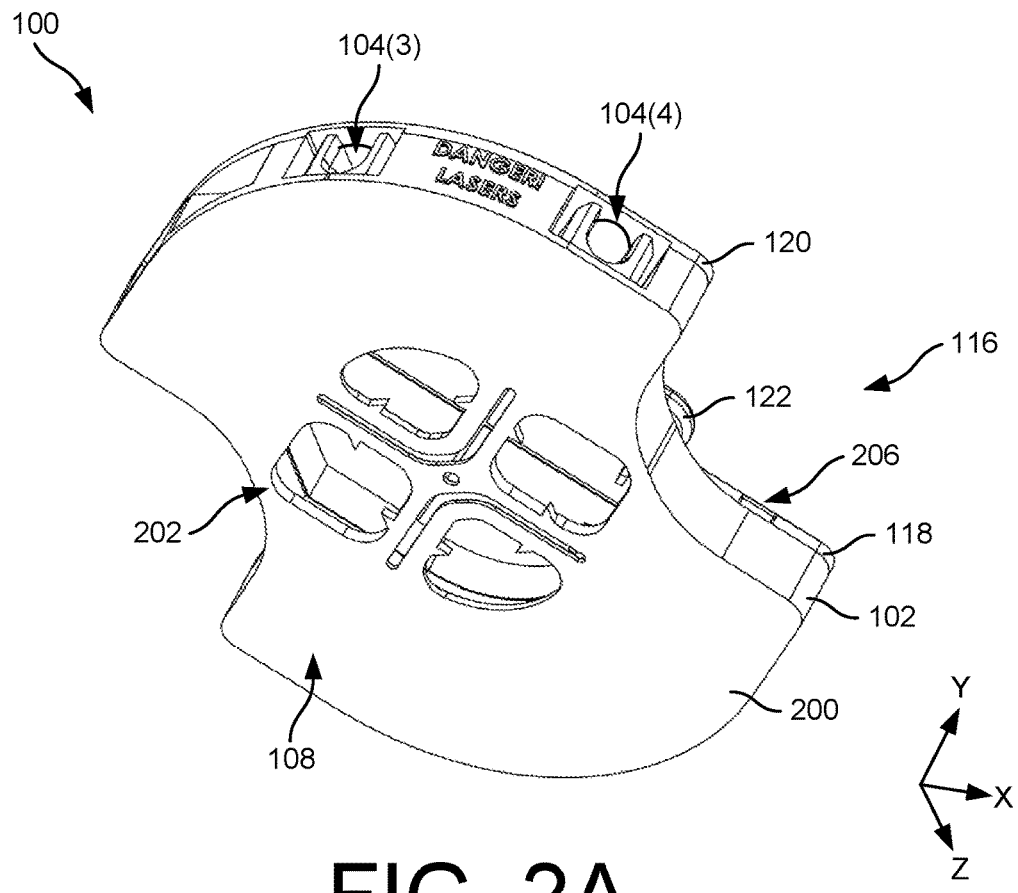
FIGS. 2A and 2B illustrate perspective views of a second side of the device of FIGS. 1A and 1B, according to an example of the present disclosure.
Figure 2B:
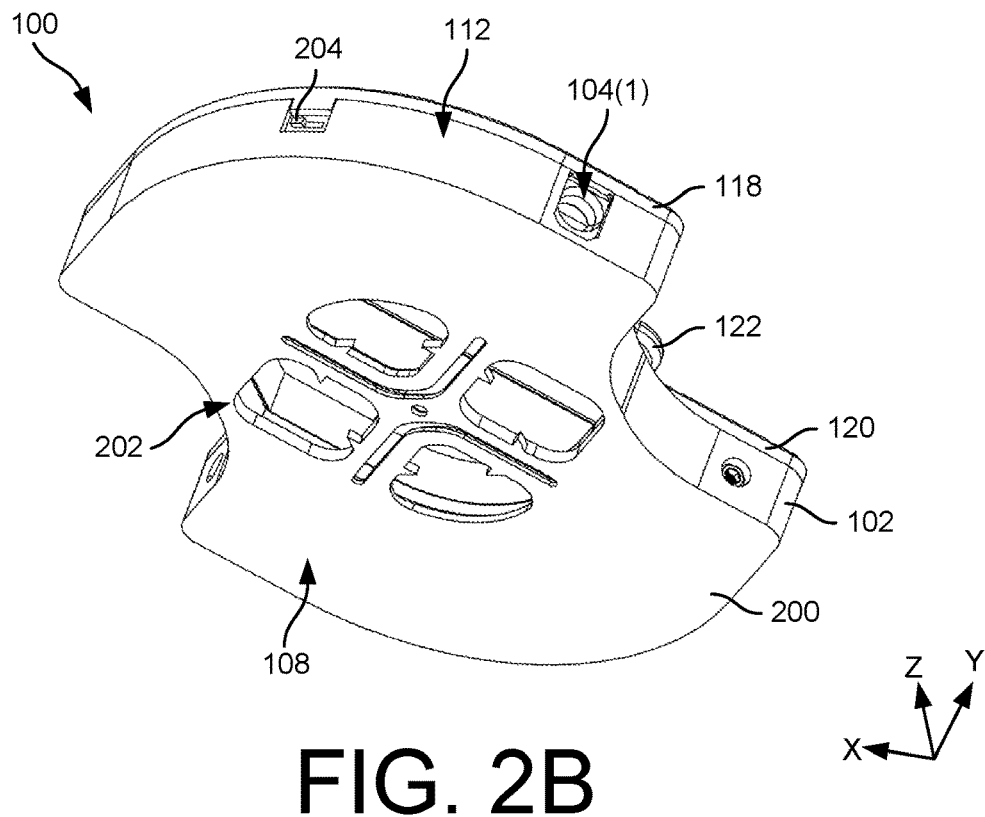

FIGS. 2A and 2B illustrate the device 100, according to an example of the present disclosure. The views shown in FIGS. 2A and 2B may illustrate bottom perspective views of the device 100.

As introduced above, the device 100 may include the housing 102, and the first cover 118 and the second cover 120 may couple to the housing 102. The bottom 108 of the device, or a bottom surface 200 of the housing 102, is configured to rest on the ground surface within an environment. As will be explained in detail herein, the housing 102 may define an alignment mechanism 202 that is usable to scribe or otherwise mark locations on the ground surface corresponding to a placement of a fiducial on the ground surface. The alignment mechanism 202 may be formed within the bottom surface 200 of housing 102. When the device 100 is placed on the ground surface, the alignment mechanism 202 may be usable (or otherwise accessible) via removing the calibration tool 122 from the device 100.

The device 100 includes a switch 204 that is used to activate (e.g., turn on/off) the lasers 104. In some instances, the switch 204 is movable between a first position (e.g., to deactivate the lasers 104) and a second position (e.g., to activate the lasers 104). In some instances, movement of the switch 204 from the first position to the first position to the second position may activate all of the lasers 104. However, in some instances, the switch 204 may include other positions (e.g., third position, fourth position, etc.) for activating only a subset of the lasers 104. As shown, and in some instances, the switch 204 may be located along the back 112 of the device 100.

The device 100 may include a port 206 for communicatively connecting to other devices, chargers, and so forth. In some instances, the port 206 may represent a USB port, micro-USB port, and so forth. In some instances, the port 206 may be accessible along the second side 116. Additionally, the port 206 may be accessible via channels, slots, or openings formed in the housing 102 and/or the first cover 118.

Figure 3:
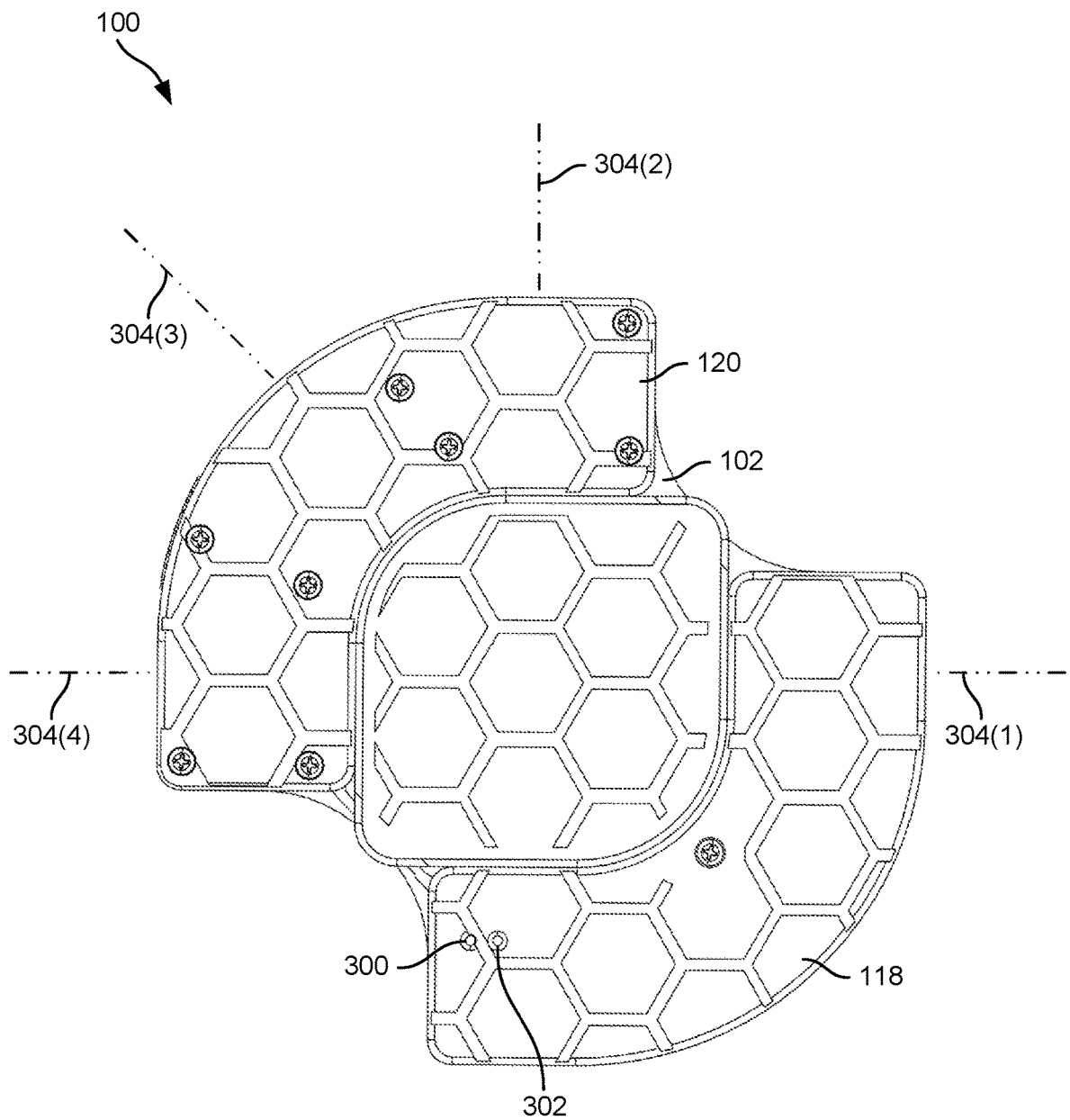
FIG. 3 illustrates a planar view of the first side of the device of FIGS. 1A and 1B, according to an example of the present disclosure.

FIG. 3 illustrates the device 100, according to an example of the present disclosure. The view shown in FIG. 3 may illustrate a top planar view of the device 100. The device 100 includes the first cover 118 and the second cover 120 that couple to the housing 102 for enclosing the lasers 104. In some instances, the first cover 118 and/or the second cover 120 may couple to the housing 102 via fasteners. As shown, the first cover 118 and/or the second cover 120 may include a semi-circular donut shape. The calibration tool 122 is removable coupled to the housing 102, at a location at least partially between the first cover 118 and the second cover 120.

In some instances, the first cover 118 defines a first passage 300 and a second passage 302. The first passage 300 and/or the second passage 302 may output light via one or more lighting element (e.g., light emitting diodes (LEDs)) disposed within the housing 102 (e.g., beneath the first cover 118). For example, the device 100 may include a first lighting element disposed beneath the first passage 300 and which indicates a battery charge of a battery of the device 100. Here, the first lighting element may output different colored light (e.g., red, yellow, green, etc.) corresponding to a charge of the battery. Additionally, a second lighting element may be disposed beneath the second passage 302 and which indicates whether the battery is being charged. For example, when the device 100 connects to an external charger (e.g., via the port 206), light from the second lighting element may be illuminated through the second passage 302 to indicate that the device 100 is being charged.

The lasers 104 are configured to output respective laser beams 304. For example, the first laser 104(1) outputs a first laser beam 304(1), the second laser 104(2) outputs a second laser beam 304(2), the third laser 104(3) outputs a third laser beam 304(3), and the fourth laser 104(4) outputs a fourth laser beam 304(4). In some instances, the first laser beam 304(1) is output in a first direction, the second laser beam 304(2) is output in a second direction, the third laser beam 304(3) is output in a third direction, and the fourth laser beam 304(4) is output in a fourth direction. In some instances, the first laser beam 304(1) and the fourth laser beam 304(4) (or the first direction and the fourth direction) are opposite (e.g., 180 degrees). Additionally, in some instances, the second laser beam 304(2) may be orthogonal (e.g., 90 degrees) to the first laser beam 304(1). Additionally, in some instances, the fourth laser beam 304(4) may be orthogonal (e.g., 90 degrees) to the second laser beam 304(2). The third laser beam 304(3) may be oriented at 45 degrees to the second laser beam 304(2) and/or the fourth laser beam 304(4), respectively.

Figure 4:
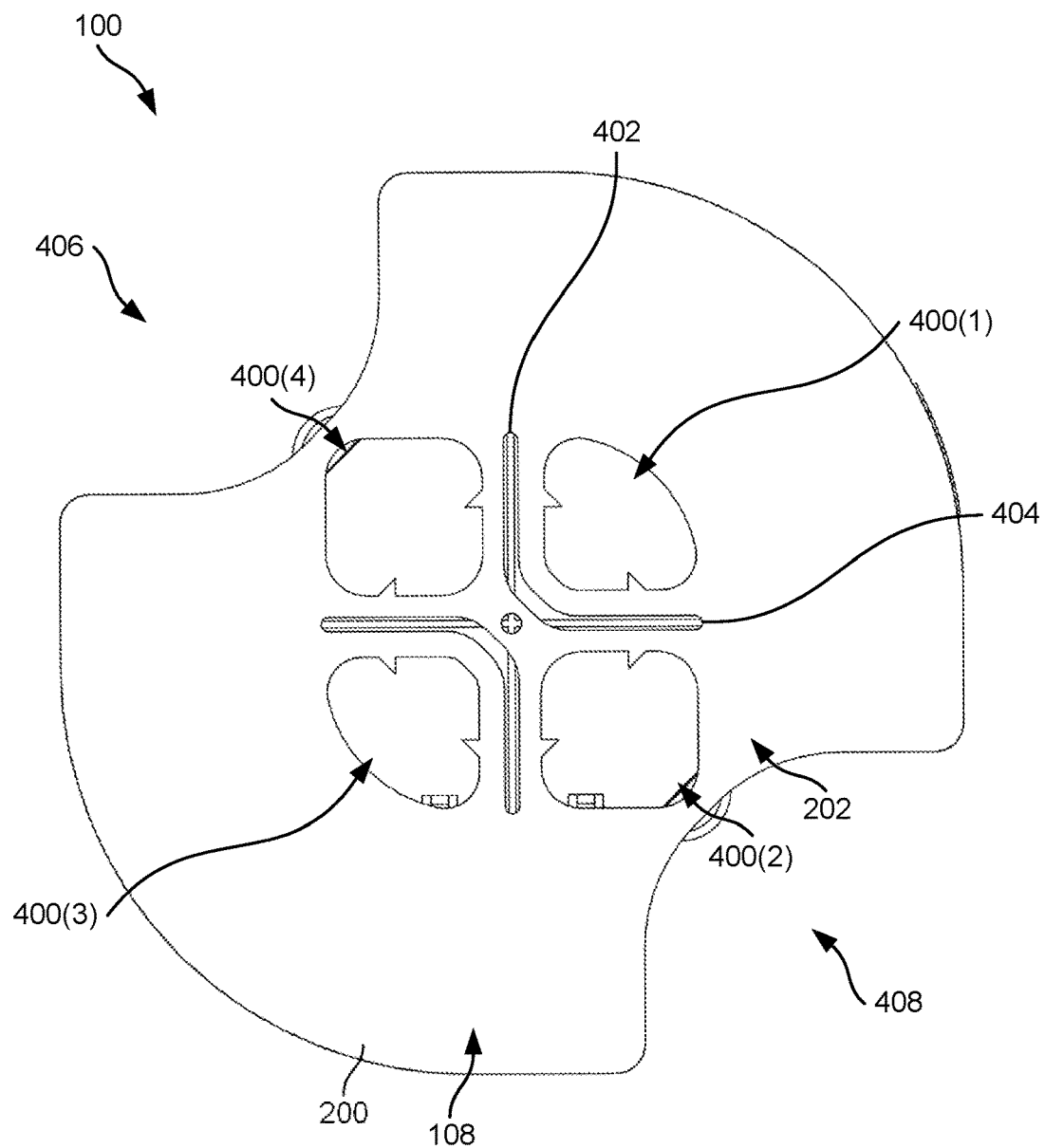
FIG. 4 illustrates a planar view of the second side of the device of FIGS. 1A and 1B, according to an example of the present disclosure.

FIG. 4 illustrates the device 100, according to an example of the present disclosure. The view shown in FIG. 4 may illustrate a bottom planar view of the device 100. The device 100 includes the bottom 108, that may be formed via the bottom surface 200 of the housing 102.

The device 100 includes the alignment mechanism 202 formed by the bottom surface 200 of the housing 102. The bottom surface 200 may be substantially planar (e.g., flat) such that the device 100 may lay on the ground surface. The housing 102 may define one or more cutouts 400 (e.g., channel, passage, etc.) that enable use of the alignment mechanism 202. For example, a first cutout 400(1), a second cutout 400(2), a third cutout 400(3), and a fourth cutout 400(4) may be formed via the housing 102. The cutouts 400 may enable the operator of the device 100 to visually see the ground surface, or the fiducial, during operation. For example, when the device 100 is placed over a fiducial on the ground surface, the cutouts 400 may enable the operator to see the fiducial for aligning the device 100 on the fiducial.

The alignment mechanism 202 may further include one or more tabs that serve to align the device 100 on the fiducial, and/or channels that enable the operator to mark the ground surface. For example, the alignment mechanism 202 may include a first channel 402 and a second channel 404. A marker (e.g., pen, pencil, etc.) may be placed within the first channel 402 and the second channel 404 to mark locations on the ground surface corresponding to a placement of the fiducial.

In some instances, the device 100 includes a first indentation 406 formed by the housing 102 along the first side 114, and a second indentation 408 formed by the housing 102 along the second side 116. The first indentation 406 and/or the second indentation 408 may assist an operation of the device 100 gripping or otherwise grasping the device 100. In some instances, ends or sides of the calibration tool 122 may extend beyond a perimeter within the first indentation 406 and/or the second indentation 408 to allow the calibration tool 122 to be conveniently removed from the device 100.

FIG. 5 illustrates the device 100, according to an example of the present disclosure. The view shown in FIG. 5 may illustrate the front 110 and the first side 114 of the device 100. As will be explained herein, the lasers 104 may reside within cavities formed by the housing 102, and in some instances, are coupled to or disposed in couplers that secure the lasers 104 to the housing 102. Additionally, the lasers 104 may be adjustable in order to calibrate the lasers 104. For example, after manufacturing or otherwise assembling the device 100, the lasers 104 may be calibrated such that, for example, the second laser 104(2) is oriented 90 degrees from the first laser 104(1), the third laser 104(3) is 45 degrees from the second laser 104(2), and the fourth laser 104(4) is 90 degrees the second laser 104(2). In some instances, the device 100 includes adjustment mechanisms, such as set screws, that are configured to adjust an orientation of the lasers 104, respectively. In some instances, the second laser 104(2), the third laser 104(3), and the fourth laser 104(4) may be adjustable, while the first laser 104(1) may be stationary (e.g., serve as a datum).

The device 100 may include a first set screw 500 for adjusting the orientation of the second laser 104(2), and a second set screw 502 for adjusting an orientation of the third laser 104(3). The first set screw 500 may engage with a coupler that secures that second laser 104(2) within or to the housing 102, while the second set screw 502 may engage with a coupler that secures that third laser 104(3) within or to the housing 102. In some instances, the second laser 104(2) and/or the third laser 104(3) are configured to translate, rotate, or pivot during adjustment via the first set screw 500 and the second set screw 502, respectively. Given the location of the third laser 104(3) along the front 110, the housing 102 may further include a pocket 504 (e.g., alcove, bay, etc.) that provides access to the second set screw 502.

FIG. 6 illustrates the device 100, according to an example of the present disclosure. The view shown in FIG. 6 may illustrate the back 112 and the second side 116 of the device 100. The device 100 includes a third set screw 600 for adjusting the orientation of the fourth laser 104(4). As shown, the third set screw 600 may be disposed along the second side 116 of the device 100. The switch 204 is further shown located at the back 112, for example, for controlling an operation of the lasers 104. A line A-A is further shown, which is used to illustrate a cross-sectional view of the device 100 in FIG. 9.

FIG. 7 illustrates the device 100, according to an example of the present disclosure. The view shown in FIG. 7 may illustrate the front 110 of the device 100. In some instances, the second laser 104(2), the third laser 104(3), and the fourth laser 104(4) may be arranged along the front 110 of the device 100. In some instances, the third laser 104(3) is oriented at 45 degrees from the second laser 104(2) and/or 45 degrees from the fourth laser 104(4). The orientation of the lasers 104, or a subset thereof, may be adjustable. For example, the second set screw 502 may adjust an orientation of the third laser 104(3) (or the third laser beam 304(3) emitted via the third laser 104(3)). The second set screw 502 may be accessible via the pocket 504.

FIG. 8 illustrates the device 100, according to an example of the present disclosure. The view shown in FIG. 8 may illustrate the back 112 of the device 100. The back 112 includes the switch 204 that controls an operation of the device 100, such as the lasers 104. As also shown, the first laser 104(1) may be disposed along the back 112 and/or the first side 114.

Figure 9:
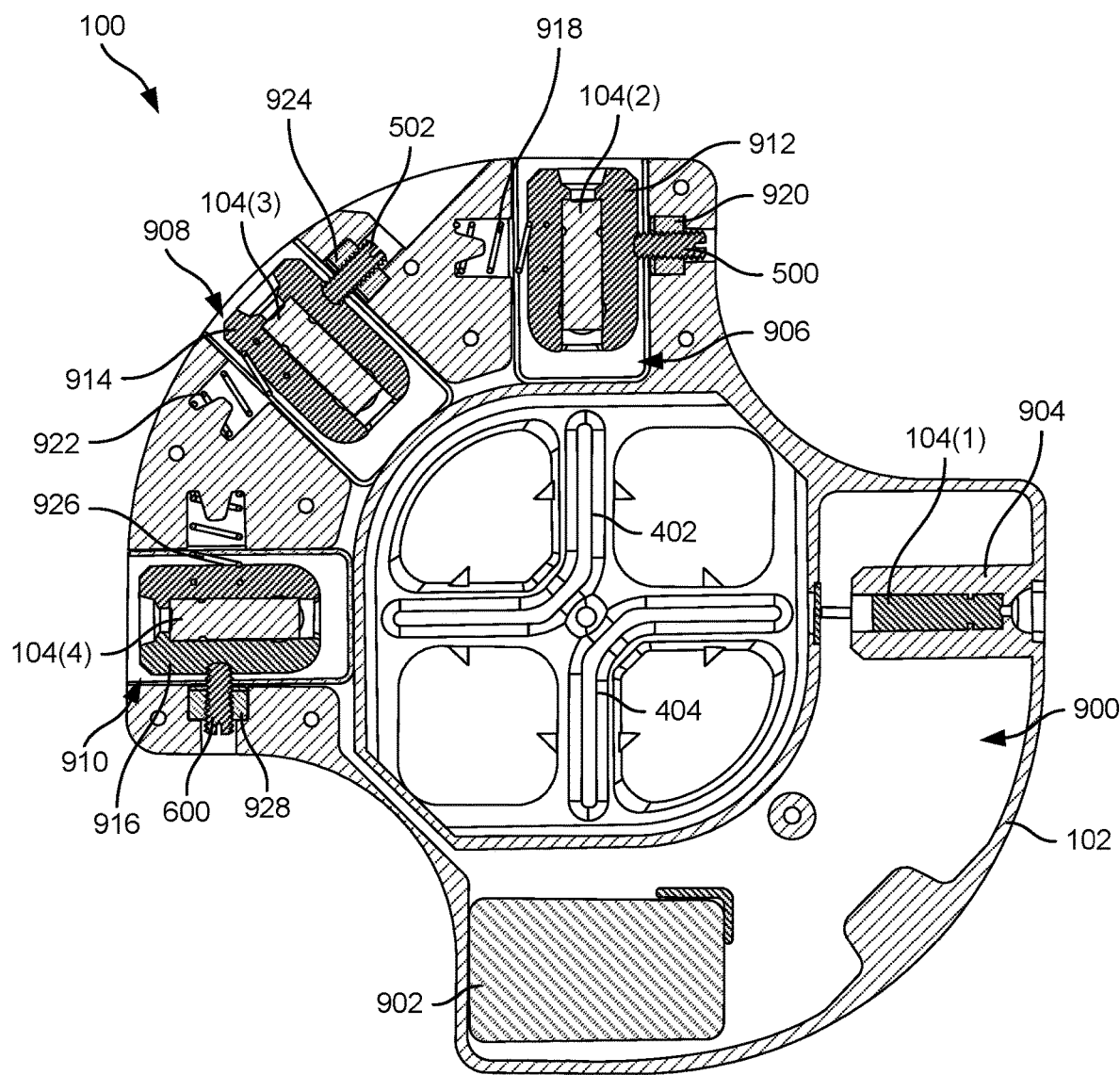
FIG. 9 illustrates a cross-sectional view of the device of FIGS. 1A and 1B, taken along line A-A of FIG. 6, according to an example of the present disclosure.

FIG. 9 illustrates a cross-sectional view of the device 100, taken along line A-A of FIG. 6, according to an example of the present disclosure. The housing 102 includes or defines a first cavity 900 that receives the first laser 104(1), as well as a battery 902 of the device 100. The first cavity 900 may receive the switch 204 (or a portion thereof), as well as other components of the device 100, as discussed herein. In some instances, within the first cavity 900, the housing 102 may include a receptacle 904 that receives the first laser 104(1) and which orients the first laser beam 304(1) in the first direction. The first laser 104(1) may be fixed within the receptacle 904.

The housing 102 may also include or define a second cavity 906, a third cavity 908, and a fourth cavity 910. The second laser 104(2) may reside at least partially within the second cavity 906, the third laser 104(3) may at least partially reside within the third cavity 908, and the fourth laser 104(4) may at least partially reside within the fourth cavity 910. In some instances, the second laser 104(2) may be received within a first coupler 912 that at least partially resides within the second cavity 906, the third laser 104(3) may be received within a second coupler 914 that at least partially resides within the third cavity 908, and the fourth laser 104(4) may be received within a third coupler 916 that at least partially resides within the fourth cavity 910. In some instances, the first coupler 912, the second coupler 914, and the third coupler 916 enable the second laser 104(2), the third laser 104(3), and the fourth laser 104(4) to be respectively coupled to the device 100. As will be discussed herein, the first coupler 912, the second coupler 914, and the third coupler 916 include a channel that receives the second laser 104(2), the third laser 104(3), and the fourth laser 104(4), respectively.

In some instances, and as introduced above, the device 100 includes calibration mechanisms that calibrate the laser beams 304 of the lasers 104, respectively. For example, the device 100 may include set screws that engage with the first coupler 912, the second coupler 914, and the third coupler 916 to adjust or change an orientation of the second laser 104(2), the third laser 104(3), and the fourth laser 104(4), respectively. For example, after manufacturing the device 100, the second laser 104(2), the third laser 104(3), and the fourth laser 104(4) may adjusted such that the second laser beam 304(2) is orthogonal to the first laser beam 304(1) and/or the fourth laser beam 304(4), and that the third laser beam is at 45 degrees to the second laser beam 304(2) and the fourth laser beam 304(4). Additionally, biasing elements may engage with the first coupler 912, the second coupler 914, and the third coupler 916 for securing the second laser 104(2), the third laser 104(3), and the fourth laser 104(4), respectively, within the housing 102 and/or to enable the orientation of the second laser 104(2), the third laser 104(3), and the fourth laser 104(4) to be adjusted.

To further illustrate, the first set screw 500 (e.g., first fastener) may engage with a first side of the first coupler 912, and a first biasing element 918 may engage with a second side of the first coupler 912. The first set screw 500 may be threadingly engaged with a first nut 920 (e.g., second fastener). During rotation of the first set screw 500 in a first direction (e.g., to tighten) the first biasing element 918 may compress, and during rotation of the first set screw 500 in a second direction (e.g., to loosen), the first biasing element 918 may extend. By adjusting the first set screw 500, the orientation of the second laser 104(2) (and correspondingly, the second laser beam 304(2)) may be adjusted. Similarly, the second set screw 502 (e.g., third fastener) may engage with a first side of the second coupler 914, and a second biasing element 922 may engage with a second side of the second coupler 914. The second set screw 502 may be threadingly engaged with a second nut 924 (e.g., fourth fastener). Likewise, the third set screw 600 (e.g., fifth fastener) may engage with a first side of the third coupler 916, and a third biasing element 926 may engage with a second side of the third coupler 916. The third set screw 600 may be threadingly engaged with a third nut 928 (e.g., sixth fastener).

The first cavity 900, the second cavity 906, the third cavity 908, and the fourth cavity 910 may be connected to one another such that wires may communicatively connect the lasers 104 to the battery 902, the switch 204, and so forth. For example, the battery 902 is shown residing within the first cavity 900, and the lasers 104 may be communicatively connected to the battery 902 for receiving power. In addition, computing components (e.g., controllers, processor(s), memory, etc.) may reside within the first cavity 900 for controlling operations of the device 100.

As shown, the first laser 104(1) may align with a portion of the first channel 402 and/or the second channel 404. Additionally, the fourth laser 104(4) may align with a portion of the first channel 402 and the second channel 404. The second laser 104(2) may align with a portion of the first channel 402 and/or the second channel 404. In doing so, marking made on the ground surface using the first channel 402 and/or the second channel 404 may be aligned with the laser beams 304 emitted by the lasers 104.

Figure 10A:
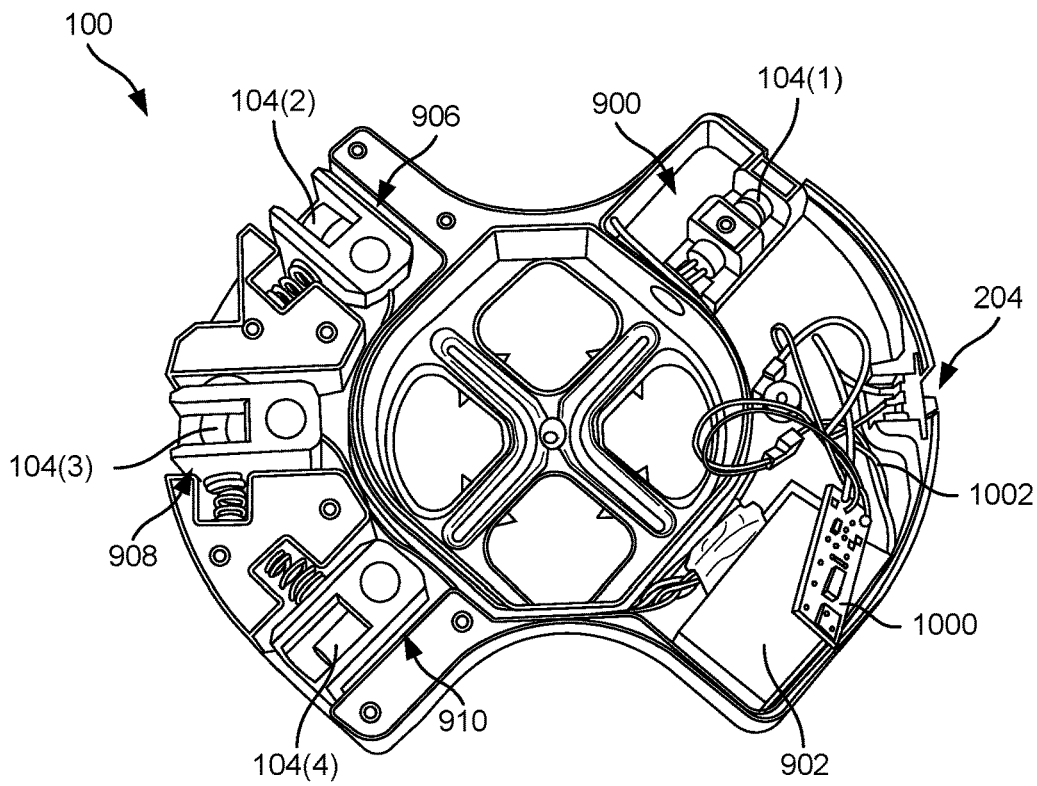
FIGS. 10A and 10B illustrate partial dissembled views of the device of FIGS. 1A and 1B, showing example components of the device, according to an example of the present disclosure.
Figure 10B:
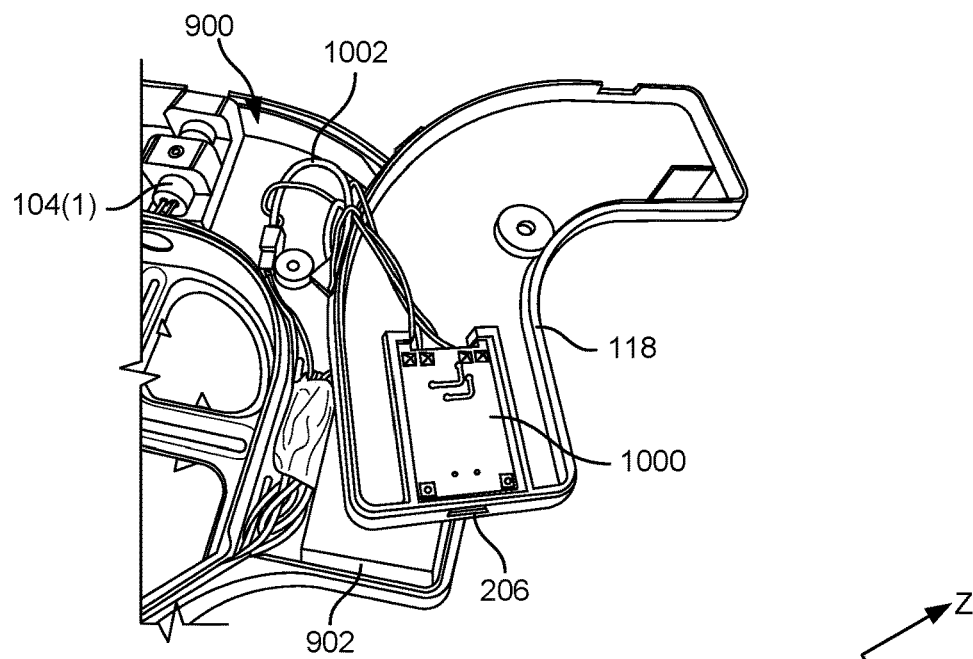

FIGS. 10A and 10B illustrate example components of the device 100, according to an example of the present disclosure. In FIG. 10A, the first cover 118 and the second cover 120 are shown removed from the device 100, and in FIG. 10B, the first cover 118 is shown housing components of the device 100.

As introduced above in FIG. 9, the first laser 104(1) resides within the first cavity 900, and the second laser 104(2), the third laser 104(3), and the fourth laser 104(4) reside within the second cavity 906, the third cavity 908, and the fourth cavity 910, respectively. The switch 204 may communicatively couple with a printed circuit board (PCB) 1000. The PCB 1000 may include various computing circuitry and/or components (e.g., resistors, capacitors, processor(s), etc.) to permit an operation of the device 100. In some instances, the PCB 1000 couples to the first cover 118 and is disposed within the first cavity 900. Additionally, the switch 204 and/or PCB 1000 may communicatively couple to the battery 902 disposed within the first cavity 900. The lasers 104, the battery 902, the switch 204, and the PCB 1000 may be communicatively connected to one another via various wires 1002. The wires 10002, for example, may route from within the first cavity 900, to the second cavity 906, the third cavity 908, and/or the fourth cavity 910, respectively. As shown in FIG. 10B, for example, the PCB 1000 may be coupled to the first cover 118. Additionally, the PCB 1000 may include a connection for coupling the PCB 1000 to a charger, for example, to charge the battery 902. The connection may be accessible via the port 206.

Figure 11:
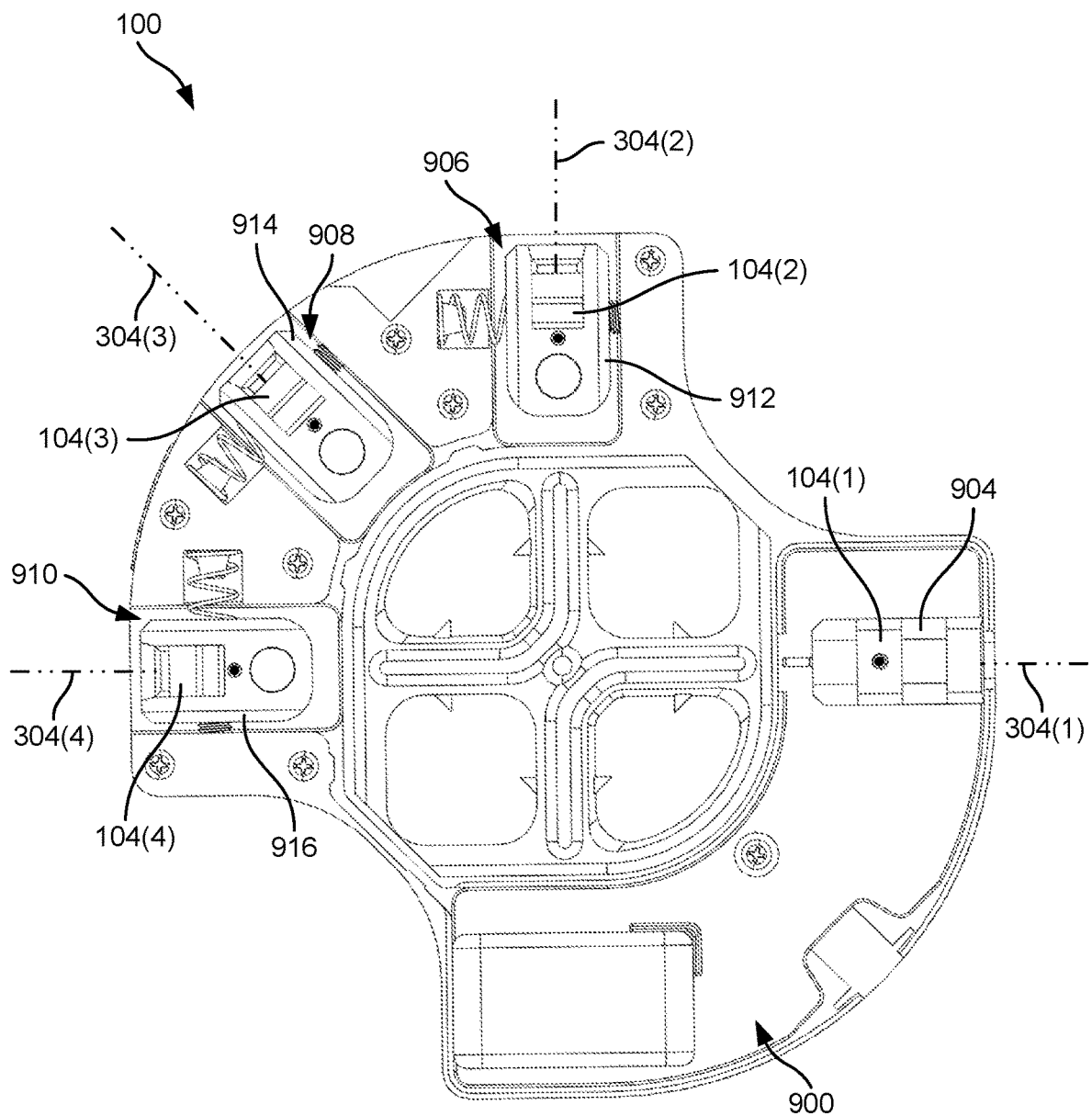
FIG. 11 illustrates example components of the device of FIGS. 1A and 1B, according to an example of the present disclosure.

FIG. 11 illustrates the lasers 104 residing within the cavities of the device 100, according to an example of the present disclosure. The first laser 104(1) is disposed within the first cavity 900 and is received by the receptacle 904 for orienting the first laser beam 304(1) in the first direction. The second laser 104(2) is received by the first coupler 912, and within the second cavity 906, for disposing the second laser beam 304(2) in the second direction. The third laser 104(3) is received by the second coupler 914, and within the third cavity 908, for disposing the third laser beam 304(3) in the third direction. The fourth laser 104(4) is received by the third coupler 916, and within the fourth cavity 910, for disposing the fourth laser beam 304(4) in the fourth direction. The set screws and the biasing elements are also engaged with the first coupler 912, the second coupler 914, and the third coupler 916, respectively.

Figure 12A:
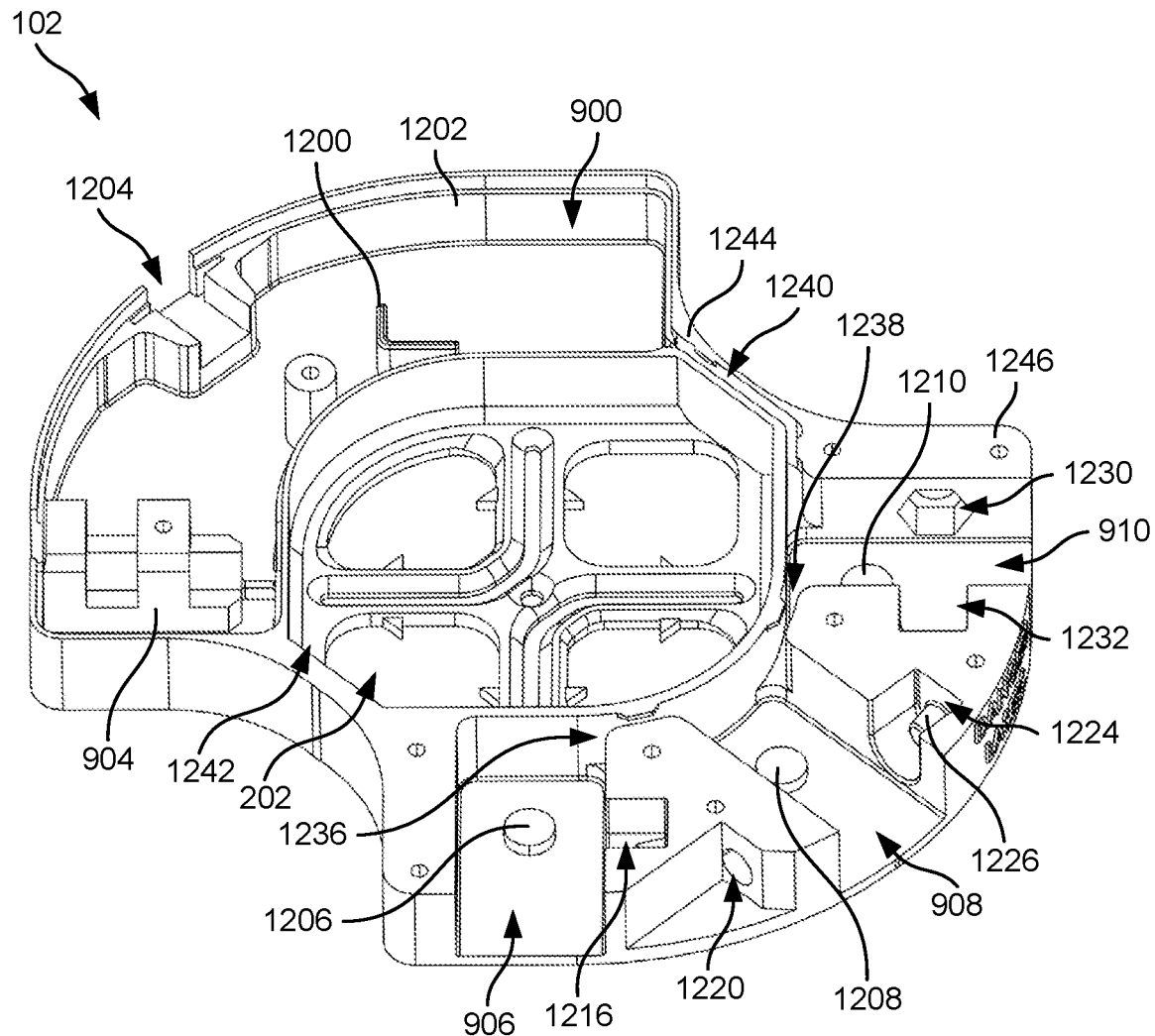
Figure 12C:
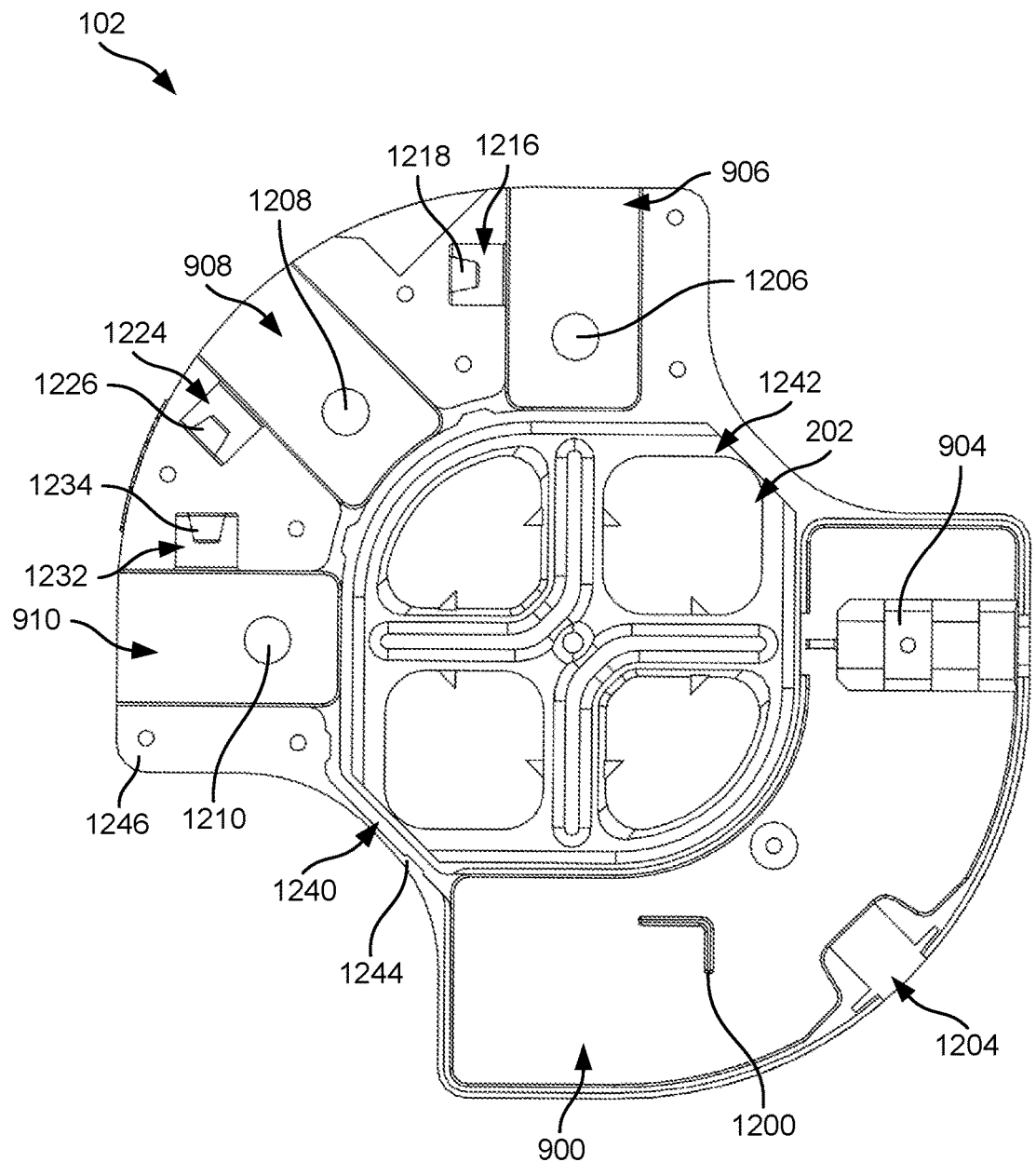

FIGS. 12A-12C illustrate the housing 102 of the device 100, according to an example of the present disclosure. FIG. 12A illustrates a first perspective view of the housing 102, from the front 110 and the first side 114, FIG. 12B illustrates a second perspective view of the housing 102, from the front 110 and the second side 116, and FIG. 12C illustrates a planar view of the housing 102 (e.g., top).

The housing 102 includes the cavities for receiving the lasers 104, as well as other components of the device 100. For example, the housing 102 includes the first cavity 900 in which the first laser 104(1), the battery 902, and the switch 204 at least partially reside. Additionally, the first cavity 900 houses at least a portion of the wires 1002 and the PCB 1000 that controls an operation of the device 100. Within the first cavity 900, the housing 102 defines the receptacle 904 that receives the first laser 104(1). The receptacle 904 may include a central channel within which the first laser 104(1) (or a body thereof), resides. In some instances, the first laser 104(1) may not be capable of being adjusted via set screws, for example. Additionally, the first cavity 900 include a flange 1200 that secures or orients the battery 902. In some instances, the battery 902 may be placed between the flange 1200 and an interior surface 1202 of the first cavity 900. The first cavity 900 includes a receptacle 1204 that receives the switch 204.

The second cavity 906, the third cavity 908, and the fourth cavity 910 are further defined by the housing 102. The second cavity 906 is configured to receive the first coupler 912 (with the second laser 104(2)), the third cavity 908 is configured to receive the second coupler 914 (with the third laser 104(3)), and the fourth cavity 910 is configured to receive the third coupler 916 (with the fourth laser 104(4)). In some instances, the housing 102 includes features for positioning the first coupler 912, the second coupler 914, and the third coupler 916. For example, a first post 1206 may be disposed in the second cavity 906, a second post 1208 may be disposed in the third cavity 908, and a third post 1210 may be disposed in the fourth cavity 910. The first post 1206 may engage with the first coupler 912, the second post 1208 may engage with the second coupler 914, and the third post 1210 may engage with the third coupler 916. For example, the first coupler 912, the second coupler 914, and the third coupler 916 may include receptacles, passages, etc. that receive the first post 1206, the second post 1208, and the third post 1210, respectively. The receptacles of the first coupler 912, the second coupler 914, and the third coupler 916 may be disposed along a bottom of the first coupler 912, the second coupler 914, and the third coupler 916, respectively.

During adjustment of the set screws, the couplers may at least partially rotate about the posts, respectively. For example, when the first set screw 500 is tightened or loosened, the first coupler 912 may rotate about the first post 1206 as the first biasing element 918 is compressed or extended. As will be explained herein, the second cover 120 may include similar features (e.g., additional post) that engage with an opposing side of the couplers. For example, a top of the first coupler 912, the second coupler 914, and the third coupler 916 may include a receptacle, passages, etc. that engages with posts extending from the second cover 120, respectively.

A first channel 1212 is defined by the housing 102 and is in connection with the first cavity 900. The first set screw 500 may be at least partially disposed or received within the first channel 1212. Additionally, the first channel 1212 permits access to the first set screw 500 (e.g., for tightening and loosening). A first chamber 1214 (e.g., socket, compartment, etc.) and a second chamber 1216 (e.g., pocket, receptacle, etc.) are also in connection with the first cavity 900. The first chamber 1214 and the second chamber 1216 may be located on opposing sides of the second cavity 906. The first chamber 1214 may receive the first nut 920, and may be located between the first channel 1212 and the second cavity 906. The first chamber 1214 may be shaped (e.g., outlined) corresponding to the first nut 920 such that during adjustment, the first nut 920 remains stationary. Within the second chamber 1216, the first biasing element 918 may be disposed about a first prong 1218. As shown, the second chamber 1216 may be open at a top, and enclosed by the second cover 120 once coupled to the housing 102.

A second channel 1220 is defined by the housing 102 and is in connection with the third cavity 908. The second set screw 502 may be at least partially disposed or received within the second channel 1220. Additionally, the second channel 1220 permits access to the second set screw 502 (e.g., for tightening and loosening). A third chamber 1222 (e.g., socket, compartment, etc.) and a fourth chamber 1224 (e.g., pocket, receptacle, etc.) are also in connection with the third cavity 908. The third chamber 1222 and the fourth chamber 1224 may be located on opposing sides of the third cavity 908. The third chamber 1222 may receive the second nut 924, and may be located between the second channel 1220 and the third cavity 908. The third chamber 1222 may be shaped (e.g., outlined) corresponding to the second nut 924 such that during adjustment, the second nut 924 remains stationary. Within the fourth chamber 1224, the second biasing element 922 may be disposed about a second prong 1226. As shown, the fourth chamber 1224 may be open at a top, and enclosed by the second cover 120 once coupled to the housing 102.

A third channel 1228 is defined by the housing and is in connection with the fourth cavity 910. The third set screw 600 may be at least partially disposed or received within the third channel 1228. Additionally, the third channel 1228 permits access to the third set screw 600 (e.g., for tightening and loosening). A fifth chamber 1230 (e.g., socket, compartment, etc.) and a sixth chamber 1232 (e.g., pocket, receptacle, etc.) are also in connection with the fourth cavity 910. The fifth chamber 1230 and the sixth chamber 1232 may be located on opposing sides of the fourth cavity 910. The fifth chamber 1230 may receive the third nut 928, and may be located between the third channel 1228 and the fourth cavity 910. The fifth chamber 1230 may be shaped (e.g., outlined) corresponding to the third nut 928 such that during adjustment, the third nut 928 remains stationary. Within the sixth chamber 1232, the third biasing element 926 may be disposed about a third prong 1234. As shown, the sixth chamber 1232 may be open at a top, and enclosed by the second cover 120 once coupled to the housing 102.

Given the location of the second laser 104(2) along the front 110, the housing 102 includes the pocket 504 (e.g., alcove, bay, etc.) that provides access to the second set screw 502. Meanwhile, the first set screw 500 and the third set screw 600 may be accessible via the first side 114 and the second side 116, respectively.

The first cavity 900, the second cavity 906, the third cavity 908, and the fourth cavity 910 may be connected for routing power, for example, to the lasers 104, respectively. For example, a first passageway 1236 may be formed between the second cavity 906 and the third cavity 908, a second passageway 1238 may be formed between the third cavity 908 and the fourth cavity 910, and a third passageway 1240 may be disposed between the first cavity 900 and the fourth cavity 910. The wires 1002, for example, may route within the third passageway 1240 (i.e., from the first cavity 900) for supplying power to the second laser 104(2), the third laser 104(3), and the fourth laser 104(4). As shown, the first passageway 1236, the second passageway 1238, and the third passageway 1240 may be open at a top of the housing 102 to permit the wires 1002 to be routed between the cavities, respectively. Upon coupling of the second cover 120 to the housing 102, the cavities may be enclosed.

A pocket 1242 is disposed between the first cavity 900 and the second cavity 906, the third cavity 908, and the fourth cavity 910. In some instances, the pocket 1242 is formed via one or more sidewalls. The pocket 1242 is sized and configured to receive the calibration tool 122 once coupled to the housing 102. In some instances, the housing 102 may include a strut 1244 (e.g., bar, member, etc.) disposed between the first cavity 900 and the fourth cavity 910. The third passageway 1240 may route within the strut 1244.

Additionally, the alignment mechanism 202 is formed via the housing 102, at a location between the first cavity 900 and the second cavity 906, the third cavity 908, and the fourth cavity 910, respectively. Additional details of the alignment mechanism 202 are discussed herein, however, as discussed above, the alignment mechanism 202 may be formed within or by the bottom surface 200 of the housing 102. The housing 102 includes a top surface 1246, opposite the bottom surface 200, to which the first cover 118 and the second cover 120 are disposed. The housing 102 may further include various posts, receptacle, and/or so forth that receive fasteners used to couple the first cover 118 and/or the second cover 120 to the housing 102.

Figure 13:
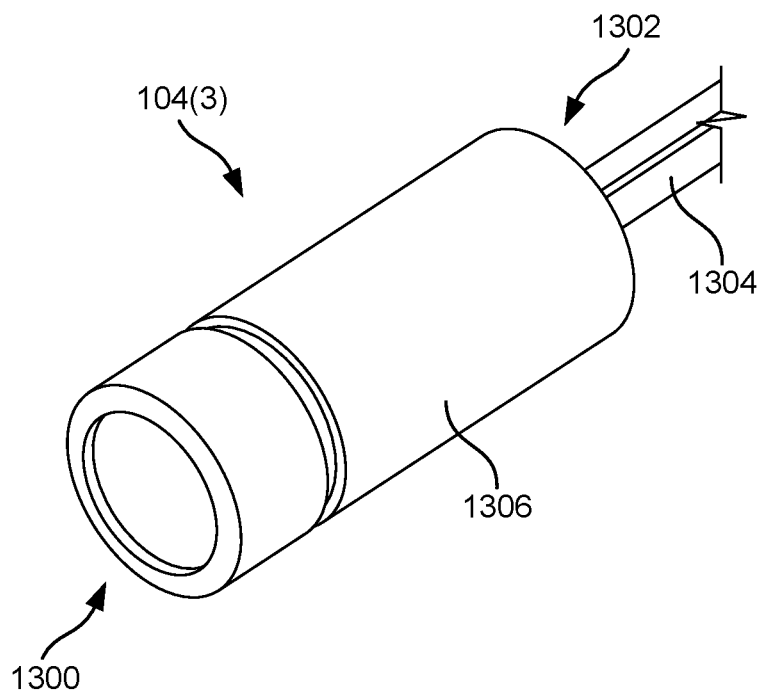
FIG. 13 illustrates an example laser of the device of FIGS. 1A and 1B, according to an example of the present disclosure.

FIG. 13 illustrates a perspective view of the third laser 104(3), according to an example of the present disclosure. Although the discussion herein relates to the third laser 104(3), the first laser 104(1), the second laser 104(2), and/or the fourth laser 104(4) may be similar to the third laser 104(3) and/or include similar components.

The third laser 104(3) includes a first end 1300 and a second end 1302 spaced apart from the first end 1300 (e.g., in the Z-direction). The third laser 104(3) is configured to output the third laser beam 304(3) from the first end 1300. One or more wires 1304, for example, may connect to the second end 1302 for receiving power. The wires 1304 may be the same as or different from the wires 1002. As shown, the third laser 104(3) (or a body thereof) may be substantially cylindrical in shape. Additionally, the third laser 104(3) includes an exterior surface 1306 disposed between the first end 1300 and the second end 1302.

Figure 14A:
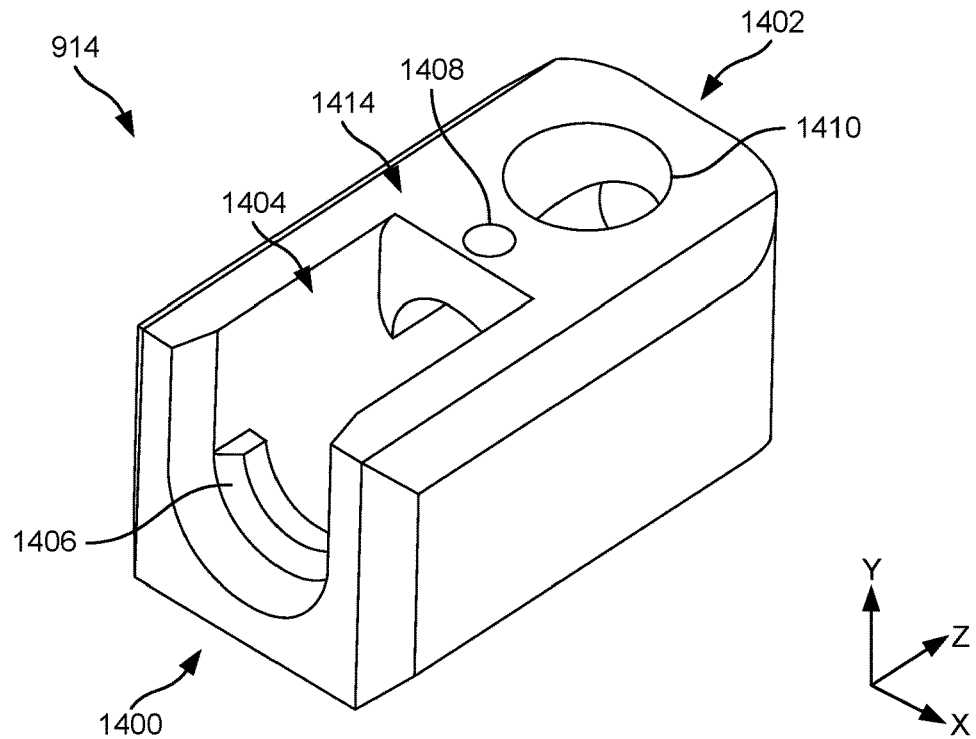
FIGS. 14A and 14B illustrate an example coupler configured to receive the laser of FIG. 13, according to an example of the present disclosure.
Figure 14B:
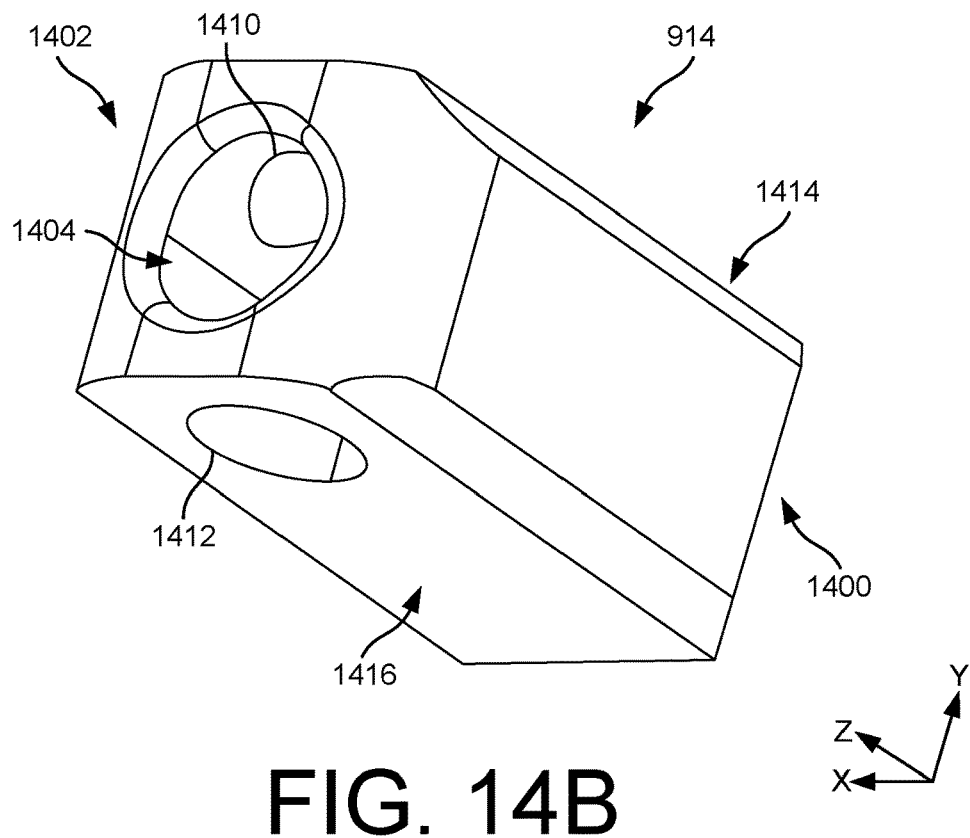

FIGS. 14A and 14B illustrate the second coupler 914 configured to receive the third laser 104(3), according to examples of the present disclosure. FIG. 14A illustrates a first side of the second coupler 914, while FIG. 14B illustrates a second side of the second coupler 914. Although the discussion herein relates to the second coupler 914, the first coupler 912 and/or the third coupler 916 may include similar components as the second coupler 914.

The second coupler 914 includes a first end 1400 and a second end 1402 spaced apart from the first end 1400 (e.g., in the Z-direction). The second coupler 914, between the first end 1400 and the second end 1402, is sized to reside within the third cavity 908. The second coupler 914 defines a channel 1404 that is sized to receive the third laser 104(3). For example, the third laser 104(3) may be placed within the channel 1404. The third laser 104(3) may be insertable into the channel 1404 at the second end 1402. In some instances, when disposed within the channel 1404, the first end 1300 of the third laser 104(3) is spaced apart from the first end 1400 of the second coupler 914 (e.g., in the Z-direction). In some instances, a flange 1406 (e.g., ledge, lip, etc.) is disposed within the channel 1404 and the first end 1300 of the third laser 104(3) may abut the flange 1406. In some instances, the second end 1302 of the third laser 104(3), when disposed within the channel 1404, may extend past the second end 1402.

The second coupler 914 also includes a passage 1408 that receives a fastener. The passage 1408 may be connected to the channel 1404. Once placed within the channel 1404, the third laser 104(3) may be secured within the channel 1404 via a fastener being treaded into the passage 1408. The fastener, for example, may engage with the exterior surface 1306 of the third laser 104(3) to secure the third laser 104(3) to the second coupler 914.

The second coupler 914 includes a first receptacle 1410 and a second receptacle 1412. The first receptacle 1410 may be located along a top 1414 of the second coupler 914 and the second receptacle 1412 may be located along a bottom 1416 of the second coupler 914 (e.g., spaced apart in the Y-direction). The first receptacle 1410 is configured to engage with a post extending from the second cover 120, while the second receptacle 1412 is configured to engage with a post, such as the second post 1208. For example, the post extending from the second cover 120 may be at least partially received within the first receptacle 1410, while the second post 1208 may be at least partially received within the second receptacle 1412. In some instances, the first receptacle 1410 and the second receptacle 1412 are concentric, such that the second coupler 914 may rotate about the posts to adjust an orientation of the third laser beam 304(3), for example. Additionally, in some instances, the first receptacle 1410 and the second receptacle 1412 may be located closer to the second end 1402 than the first end 1400.

Figure 15:
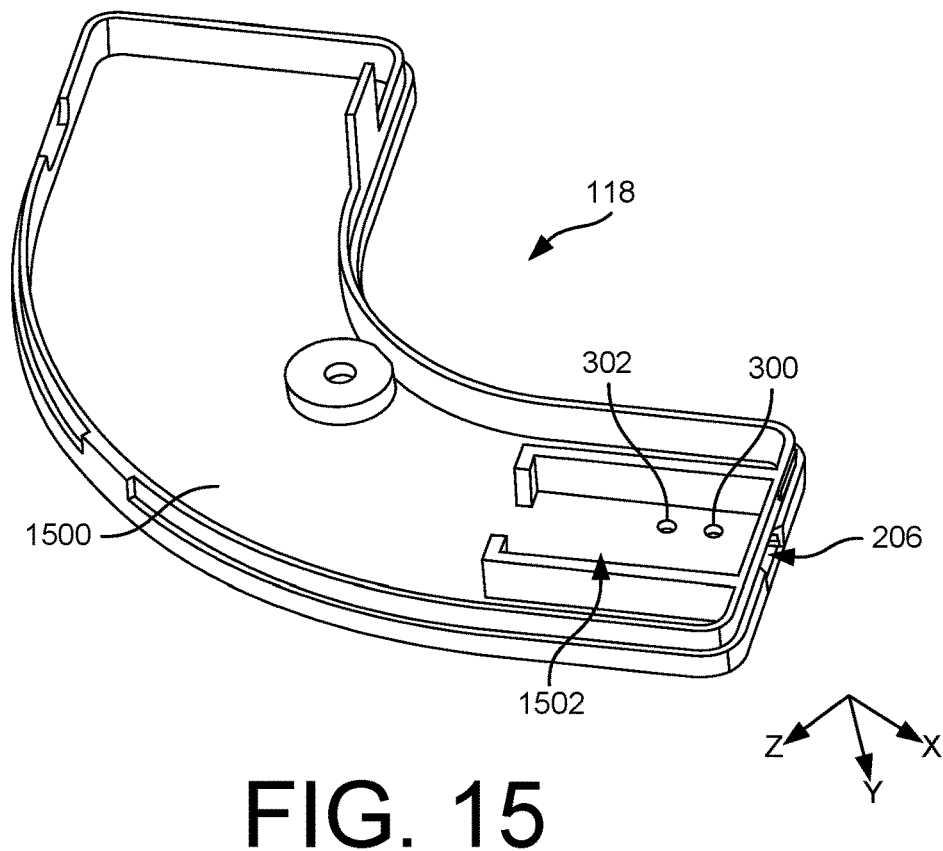
FIG. 15 illustrates an example first cover configured to couple to the housing of FIGS. 12A-12C, according to an example of the present disclosure.

FIG. 15 illustrates the first cover 118, according to an example of the present disclosure. The view shown in FIG. 15 illustrates an underneath side of the first cover 118 configured to couple to (or abut) the housing 102.

The first cover 118 includes an interior surface 1500 that defines a receptacle 1502 for receiving the PCB 1000. For example, the PCB 1000 may be disposed within the receptacle 1502 once coupled to the first cover 118. The PCB 1000 may include lighting elements that output light through the first passage 300 and the second passage 302 of the first cover 118. For example, the lighting elements disposed on the PCB 1000 may reside adjacent to the interior surface 1500 of the first cover 118 in order to output light through the first passage 300 and the second passage 302. In some instances, the port 206 communicatively connects to the receptacle 1502.

Figure 16:
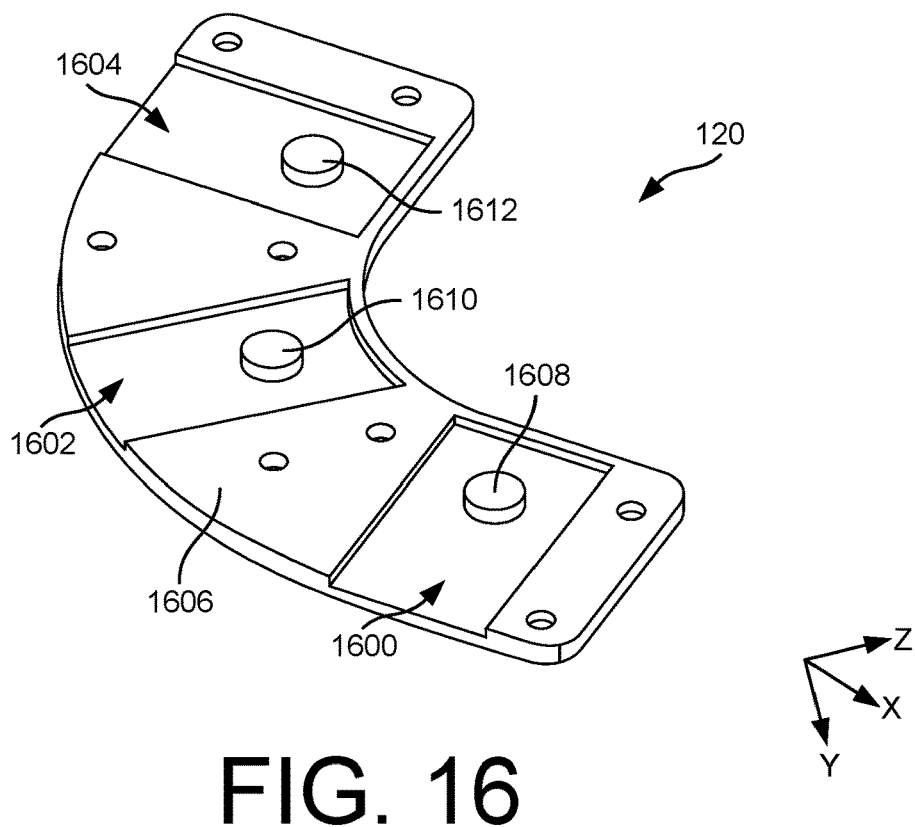
FIG. 16 illustrates an example second cover configured to couple to the housing of FIGS. 12A-12C, according to an example of the present disclosure.

FIG. 16 illustrates the second cover 120, according to an example of the present disclosure. The view shown in FIG. 16 illustrates an underneath side of the second cover 120 configured to couple to (or abut) the housing 102.

The second cover 120 includes recesses (e.g., cutout, pocket, depression, etc.) that may at least partially form the second cavity 906, the third cavity 908, and/or the fourth cavity 910. The recesses may receive the couplers, for example. In some instances, the second cover 120 defines a first recess 1600, a second recess 1602, and a third recess 1604. The first recess 1600 may align with or at partially form the second cavity 906, the second recess 1602 may align with or at least partially form the third cavity 908, and/or the third recess 1604 may align with or at least partially form the fourth cavity 910. In some instances, the recesses may be formed by an interior surface 1606 of the second cover 120. When coupled to the housing 102, the second cover 120 may enclose the second cavity 906, the third cavity 908, and the fourth cavity 910.

The second cover 120 also includes posts that engage with the couplers. In some instances, the posts may be disposed within the recesses, respectively. The second cover 120 may include a first post 1608 that engages with the first coupler 912 (e.g., a top of the first coupler 912), a second post 1610 that engages with the second coupler 914 (e.g., the top 1414 of the second coupler 914), and a third post 1612 that engages with the third coupler 916 (e.g., a top of the third coupler 916). As shown, the first post 1608 may be disposed within the first recess 1600, the second post 1610 may be disposed within the second recess 1602, and the third post 1612 may be disposed within the third recess 1604. The first post 1608, the second post 1610, and the third post 1612 may be received within receptacles of the first coupler 912, the second coupler 914, and the third coupler 916, respectively. For example, the second post 1610 may be received within the first receptacle 1410 of the second coupler 914. In some instances, once the second cover 120 couples to the housing 102, the first post 1206 may be concentric with the first post 1608, the second post 1208 may be concentric with the second post 1610, and/or the third post 1210 may be concentric with the third post 1612.

The second cover 120 may also include holes (e.g., passages, channels, etc.) through with fasteners are disposed for coupling the second cover 120 to the housing 102.

Figure 17A:
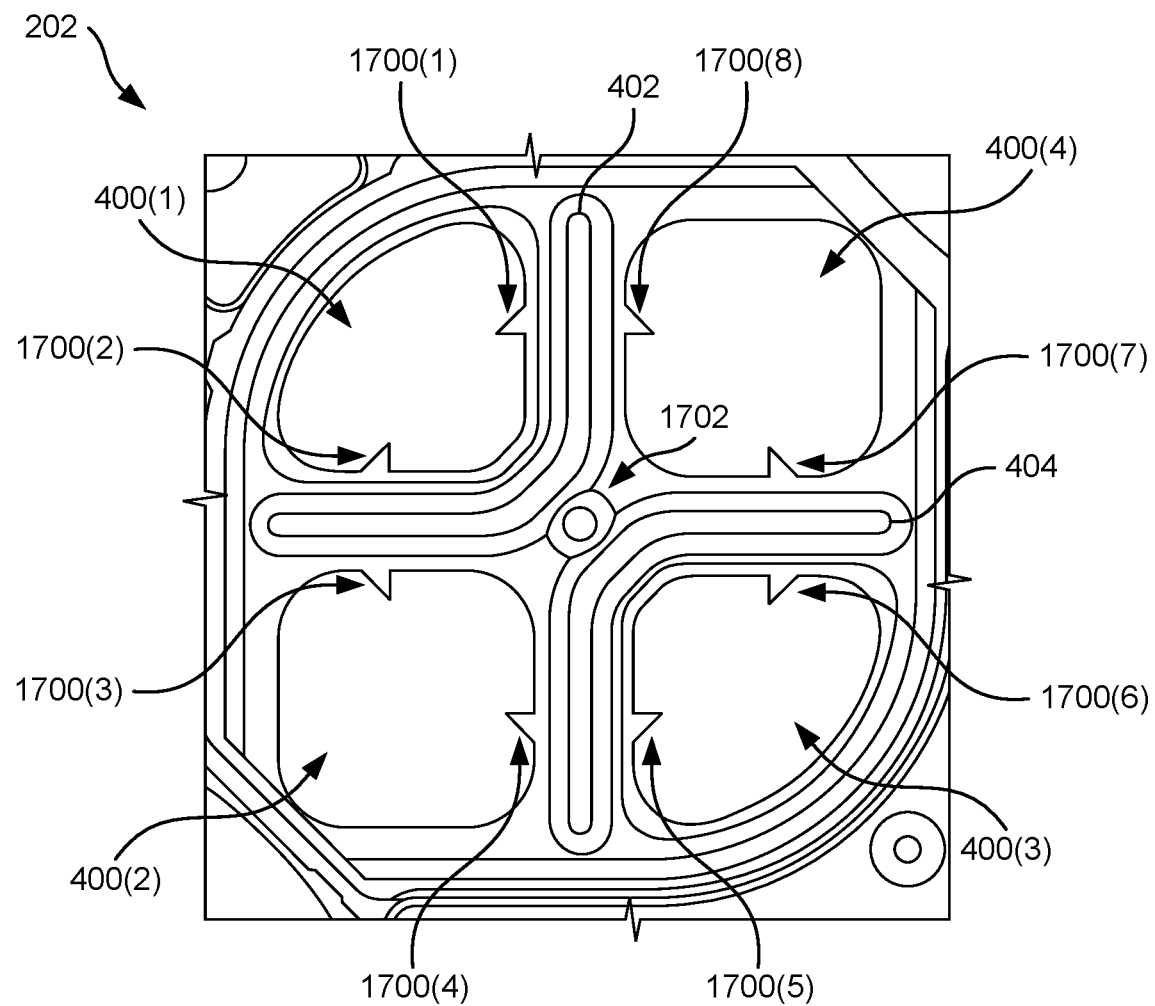
FIGS. 17A and 17B illustrate an example alignment mechanism of the device of FIGS. 1A and 1B, according to an example of the present disclosure.
Figure 17B:
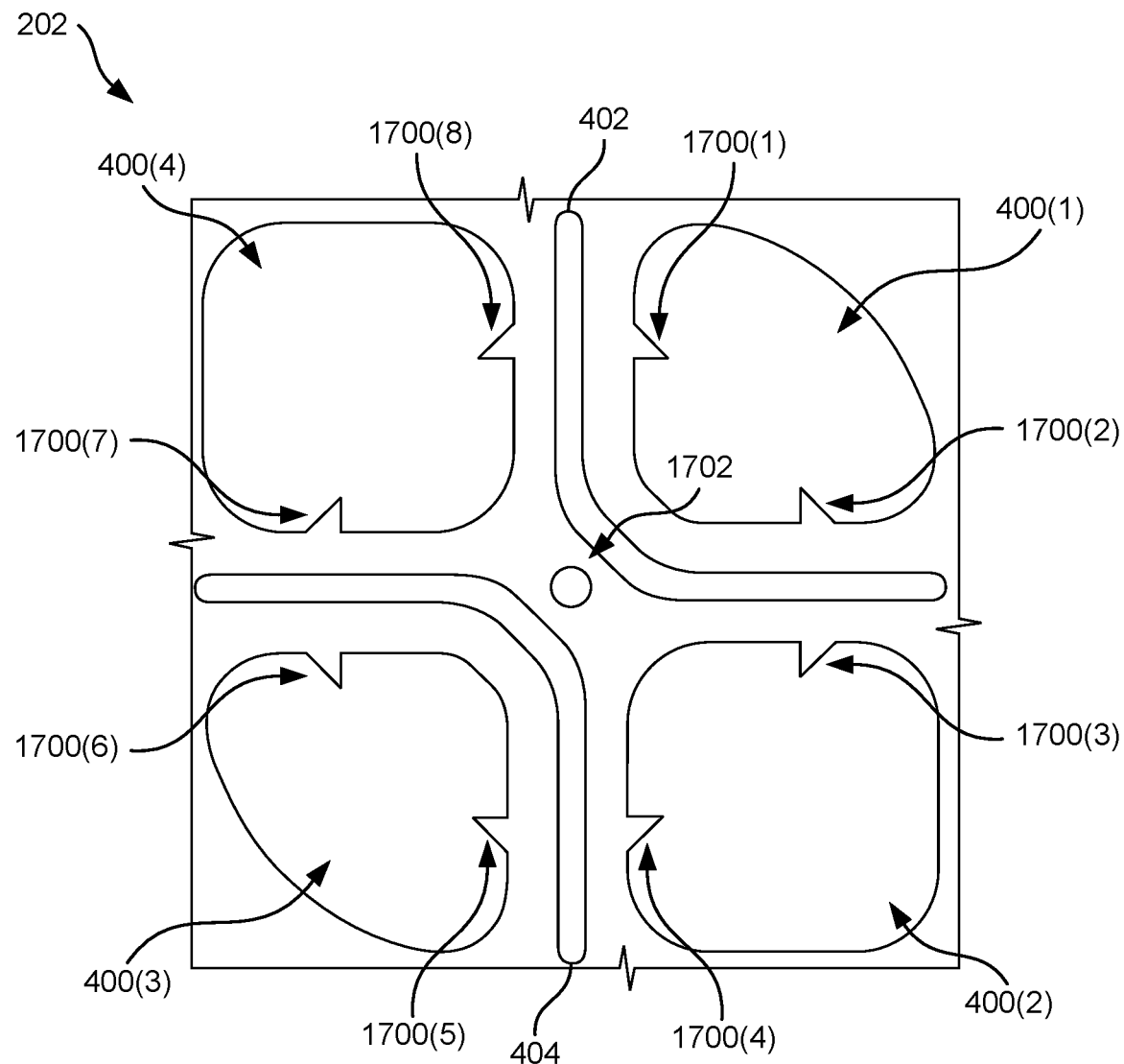

FIGS. 17A and 17B illustrate the alignment mechanism 202 of the device 100, according to an example of the present disclosure. FIG. 17A may illustrate a top view of the alignment mechanism 202, while FIG. 17B may illustrates a bottom view of the alignment mechanism 202.

As introduced above, the alignment mechanism 202 may serve to align the device 100 on a fiducial residing on the ground surface. For example, the alignment mechanism 202 may include tabs 1700 (e.g., arrows) that align on an outside border of the fiducial. In some instances, the tabs 1700 include a first tab 1700(1), a second tab 1700(2), a third tab 1700(3), a fourth tab 1700(4), a fifth tab 1700(5), a sixth tab 1700(6), a seventh tab 1700(7), and an eighth tab 1700(8). In some instances, the first tab 1700(1) and the second tab 1700(2) may extend into or be disposed in the first cutout 400(1), the third tab 1700(3) and the fourth tab 1700(4) may extend into or be disposed in the second cutout 400(2), the fifth tab 1700(5) and the sixth tab 1700(6) may extend into or be disposed in the third cutout 400(3), and the seventh tab 1700(7) and the eighth tab 1700(8) may extend into or be disposed in the fourth cutout 400(4). The first cutout 400(1), the second cutout 400(2), the third cutout 400(3), and the fourth cutout 400(4) permit viewing of the fiducial for aligning the tabs 1700 on the outside border of the fiducial.

The alignment mechanism 202 further includes the first channel 402 and the second channel 404. The first channel 402 and the second channel 404 are sized to receive a marker, for example, such that the ground surface may be marked (e.g., when a fiducial is being installed). For example, a marker may be placed in the first channel 402 or the second channel 404, and moved between respective ends thereof. In some instances, the first channel 402 and the second channel 404 include two sections that are disposed at 90 degrees. In doing so, the ground surface may be marked at four locations that are disposed 90 degrees apart. In some instances, the first channel 402 is disposed along two sides of the first cutout 400(1), one side of the second cutout 400(2), and one side of the fourth cutout 400(4). The second channel 404 may be disposed along two sides of the third cutout 400(3), one side of the second cutout 400(2), and one side of the fourth cutout 400(4). In some instances, the first cutout 400(1) is disposed between the first channel 402 and the third cavity 908. The third cutout 400(3) may be disposed between the second channel 404 and the first cavity 900.

In some instances, the first tab 1700(1) and the eighth tab 1700(8) are disposed at opposite sides of the first channel 402, and the second tab 1700(2) and the third tab 1700(3) may be disposed at opposite sides of the first channel 402 (spaced apart from the first tab 1700(1) and the eighth tab 1700(8)). The fourth tab 1700(4) and the fifth tab 1700(5) are disposed at opposite sides of the second channel 404, and the sixth tab 1700(6) and the seventh tab 1700(7) may be disposed at opposite sides of the second channel 404 (spaced apart from the fourth tab 1700(4) and the fifth tab 1700(5)).

In some instances the alignment mechanism 202 includes a central opening 1702 for aligning the device 100 on a fiducial, for example. In some instances, the central opening 1702 is centrally disposed on the device 100 for marking a center of the device 100 on the ground surface for use in confirming a placement of the fiducials within the environment 100. For example, the laser beams 304 may be aligned with adjacent fiducials, and using the central opening 1702, the ground surface may be marked. The device 100 may thereafter be reoriented, while maintaining the central opening 1702 over the marked position, to check the alignment of other fiducials on the ground surface or above the environment. As such, in these instances, the device 100 may be used to survey the fiducials to determine whether the fiducials are properly disposed within the environment and/ or to mark locations on the ground surface.

Figure 18A:
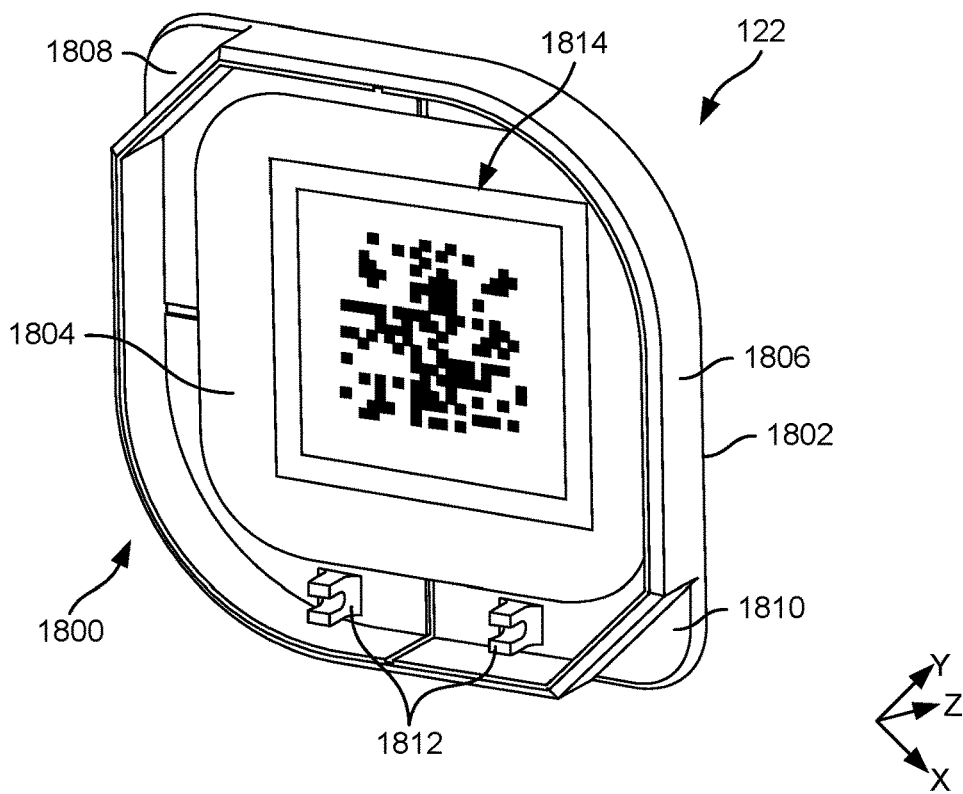
FIGS. 18A and 18B illustrate an example calibration tool of the device of FIGS. 1A and 1B, according to an example of the present disclosure.
Figure 18B:
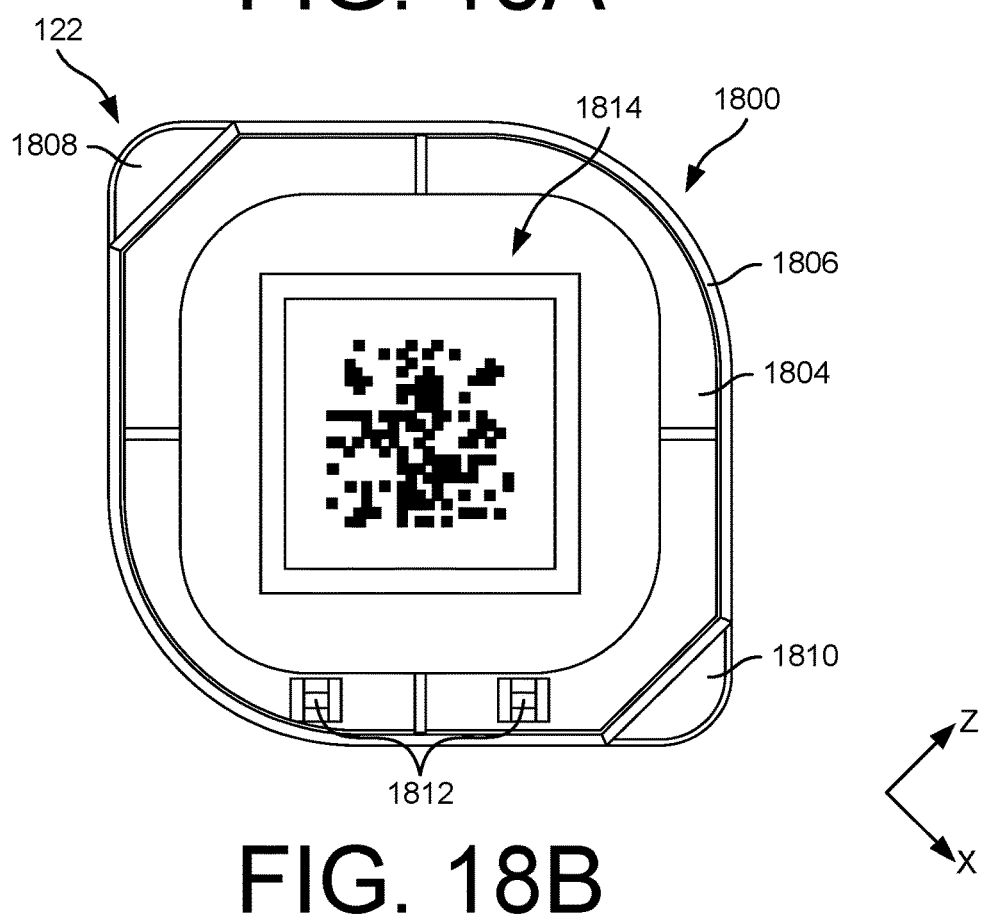

FIGS. 18A and 18B illustrate the calibration tool 122 of the device 100, according to an example of the present disclosure. FIG. 18A may illustrate a perspective view of the calibration tool 122, while FIG. 18B may illustrates a planar view of the calibration tool 122.

The calibration tool 122 is configured to reside within the pocket 1242 when coupled to the housing 102. The calibration tool 122 may include a body 1800 having an exterior surface 1802 and an interior surface 1804. The exterior surface 1802 may be disposed along the top 106 of the device 100, and the interior surface 1804 may be oriented towards the alignment mechanism 202. Sidewalls 1806 of the body 1800 may extend between the exterior surface 1802 and the interior surface 1804. In addition, the calibration tool 122 may include a first handle 1808 and a second handle 1810 that permit the calibration tool 122 to be grasped for removing the calibration tool 122 from the housing 102 (e.g., within the pocket 1242). In some instances, when the calibration tool 122 couples to the housing 102, the sidewalls 1806 may be engaged within sidewalls that form the pocket 1242.

The interior surface 1804 includes one or more prongs 1812 that serve to receive an Allen wrench (e.g., hex key) of the calibration tool 122. For example, the Allen wrench may be received within the prongs 1812 or snap into the prongs 1812. In some instances, the prongs 1812 are only disposed along one side of the calibration tool 122, however, the prongs 1812 may be located differently than shown, and may include more than or less than the number of prongs 1812 as shown. In some instances, the Allen wrench is used to adjust the first set screw 500, the second set screw 502, and/or the third set screw 600. The Allen wrench may also be used to remove the first cover 118 and/or the second cover 120 from the housing 102.

The interior surface 1804 also includes a fiducial 1814. As will be discussed herein, the calibration tool 122 may be removed from the device 100, and spaced apart from the device 100. For example, the calibration tool 122 may be aligned with other fiducials on the ground surface, and one of the lasers 104 of the device 100 may be aligned with the fiducial 1814 on the interior surface 1804.

FIG. 19 illustrates an example use of the device 100, according to an example of the present disclosure. The calibration tool 122 may be spaced apart from the device 100 (e.g., the housing 102) on a ground surface. The calibration tool 122 may be spaced apart from the device 100 by varying distance, and other fiducials may be interposed between the device 100 and the calibration tool 122. As shown, the third laser 104(3) may emit a third laser beam 304(3). The other lasers 104 may additionally emit the laser beams 304, respectively. The calibration tool 122 is aligned with the third laser beam 304(3), vice versa, to determine whether the fiducials on the ground surface, for example, are disposed properly along the third laser beam 304(3). In some instances, the fiducial 1814 may include markers that are aligned with the third laser beam 304(3). In doing so, other fiducials may be disposed along the third laser beam 304(3), at a location between the device 100 and the calibration tool 122. In some instances, the third laser beam 304(3) may be aligned with fiducials already on the ground surface, and the calibration tool 122 may be used to determine whether the fiducials are disposed on a straight line, for example.

The central opening 1702 may also be used to mark a location on the ground surface when the third laser beam 304(2) is aligned with the calibration tool 122 and/or other fiducials on the ground surface. The other laser beams may also be aligned to ensure that the device 100 is properly located. Therein, the ground surface may be marked via the central opening 1702, and the device 100 may be rotated (e.g., clockwise or counterclockwise) to align the laser beams 304 with other fiducials. However, given that that the ground surface may have been marked via the central opening 1702, the device 100 may be used to survey other fiducials in the environment (when centered on the mark).

Figure 20:
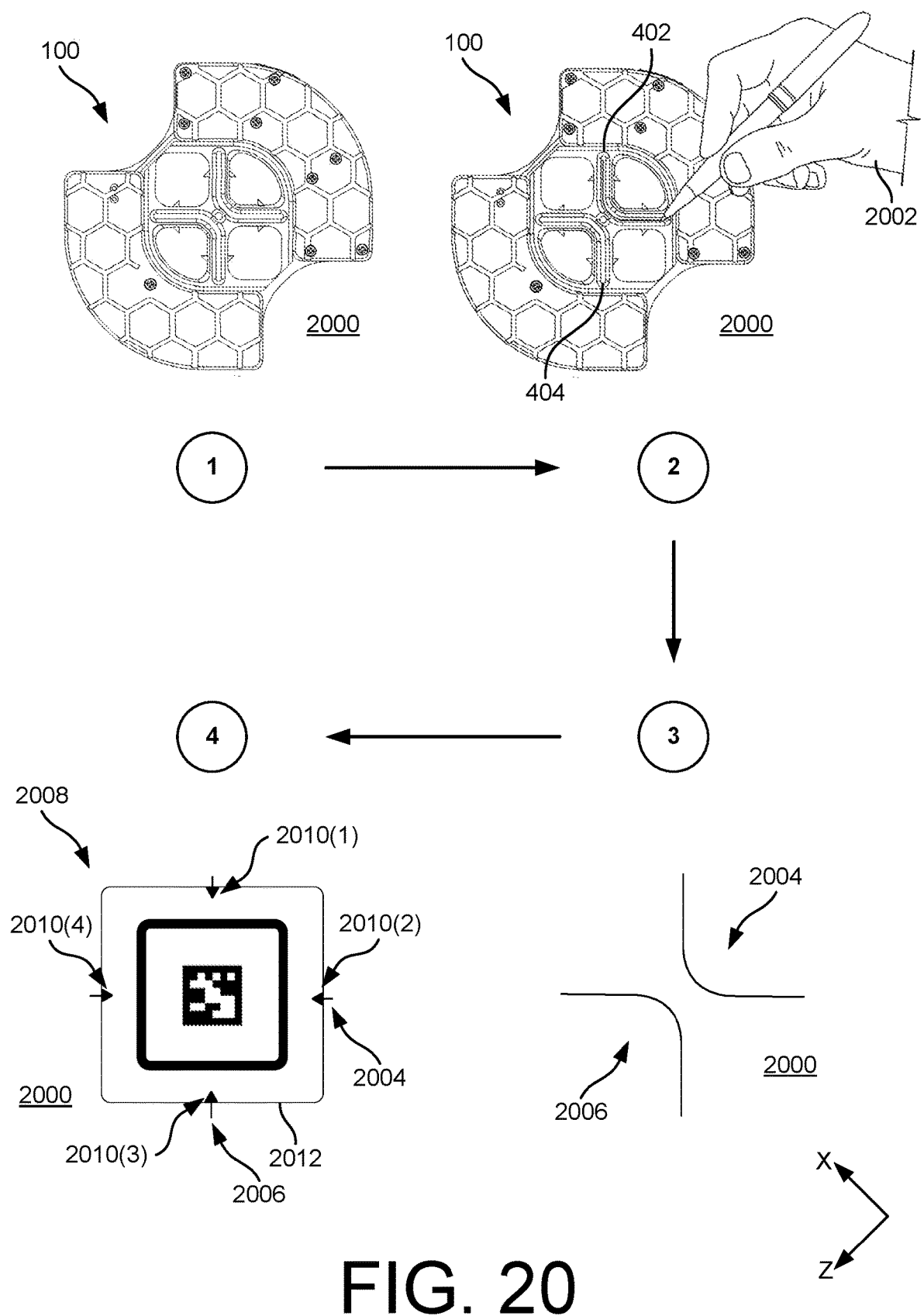
FIG. 20 illustrates an example use of the device of FIGS. 1A and 1B, according to an example of the present disclosure.

FIG. 20 illustrates an example use of the device 100, according to an example of the present disclosure. In FIG. 20, an use of the device 100 is shown from "1" to "4". Initially, at "1" the device 100 may be placed on a ground surface 2000. In some instances, when using the device 100, the calibration tool 122 may be removed. In some instances, the device 100 may be placed at a location on the ground surface 2000 in which a fiducial is to be placed. Upon turning on the lasers 104, the laser beams 304 may be aligned with adjacent fiducials on the ground surface.

At "2" a user 2002 may mark locations on the ground surface 2000. For example, using the first channel 402 and/or the second channel 404, the user 2002 may mark locations on the ground surface 2000. In some instances, the user 2002 may hold the device 100 in place while marking the locations.

At "3" the user 2002 may remove the device 100 from the ground surface 2000 to expose a first marking 2004 and a second marking 2006. The first marking 2004 may be made via the first channel 402, and the second marking 2006 may be made via the second channel 404.

At "4" the user 2002 may place a fiducial 2008 on the ground surface 2000 using the first marking 2004 and the second marking 2006. In some instances, the fiducial 2008 includes indications 2010, such as a first indication 2010(1), a second indication 2010(2), a third indication 2010(3), and a fourth indication 2010(4). In some instances, the indications 2010 are disposed along sides of the fiducial 2008, along an outer perimeter 2012 of the fiducial 2008. The indications 2010 may be respectively aligned with the first marking 2004 or the second marking 2006 to correctly place the fiducial 2008 on the ground surface 2000, and the indications 2010 may extend past the outer perimeter 2012 of the fiducial 2008. For example, the first indication 2010(1) may be aligned with a first end of the first marking 2004, and the second indication 2010(2) may be aligned with a second end of the first marking 2004. Additionally, the third indication 2010(3) may be aligned with a first end of the second marking 2006, and the fourth indication 2010(4) may be aligned with a second end of the second marking 2006.

Figure 21:
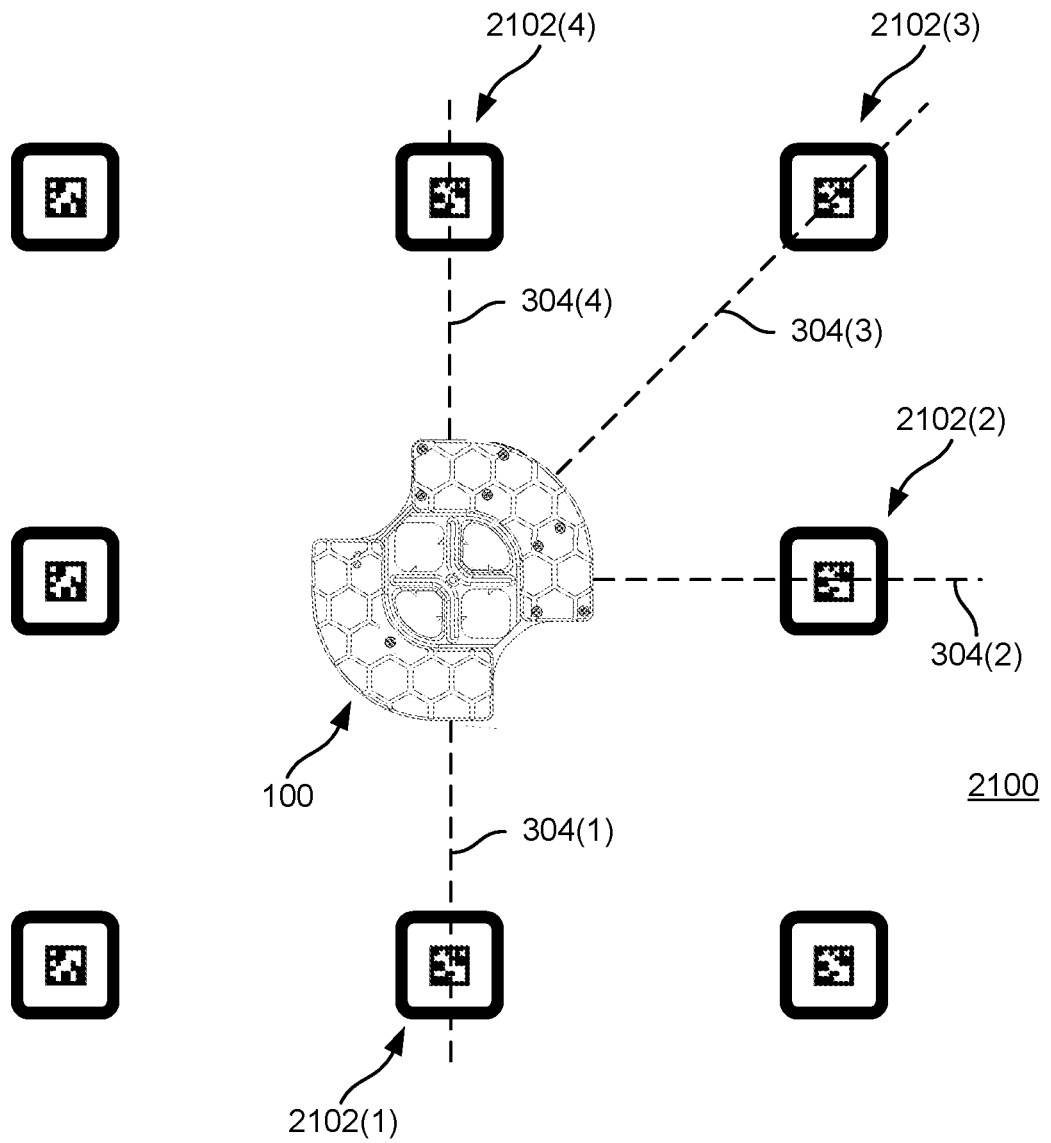
FIG. 21 illustrates an example use of the device of FIGS. 1A and 1B, according to an example of the present disclosure.

FIG. 21 illustrates an example use of the device 100, according to an example of the present disclosure. In some instances, the device 100 may be placed at a location on a ground surface 2100 in which a fiducial is to be placed. Upon turning on the lasers 104, the laser beams 304 may be aligned with adjacent fiducials on the ground surface 2100.

For example, the first laser beam 304(1) may be aligned (e.g., orthogonally) with a first fiducial 2102(1), the second laser beam 304(2) may be aligned (e.g., orthogonally) with a second fiducial 2102(2), the third laser beam 304(3) may be aligned (e.g., diagonally) with a third fiducial 2102(3), and the fourth laser beam 304(4) may be aligned (e.g., orthogonally) with a fourth fiducial 2102(4). In some instances, the device 100 may be rotated to align the laser beams 304 with the fiducials 2102, respectively. In some instances, the device 100 may be oriented such that the laser beams 304 are aligned with the indications 2010 on the fiducials. The first fiducial 2102(1) and the fourth fiducial 2102(4) may be aligned in a column of fiducials on the ground surface 2100, and the second fiducial 2102(2) and the third fiducial 2102(3) may be aligned in a column of fiducials on the ground surface 2100. The third fiducial 2102(3) and the fourth fiducial 2102(4) may be aligned in a row of fiducials on the ground surface 2100. In some instances, to align the device 100, the laser beams 304 may be aligned with other fiducials within the rows, columns, etc. in which the first fiducial 2102(1), the second fiducial 2102(2), the third fiducial 2102(3), and the fourth fiducial 2102(4) are disposed, respectively. For example, the second laser beam 304(2) may be aligned with another fiducial within a row of fiducials in which the second fiducial 2102(2) is disposed.

After aligning the device 100, the ground surface 2100 may be marked as discussed above with regard to FIG. 20. From there, the device 100 may be removed and a fiducial may be adhered to the ground surface 2100.

Figure 22:
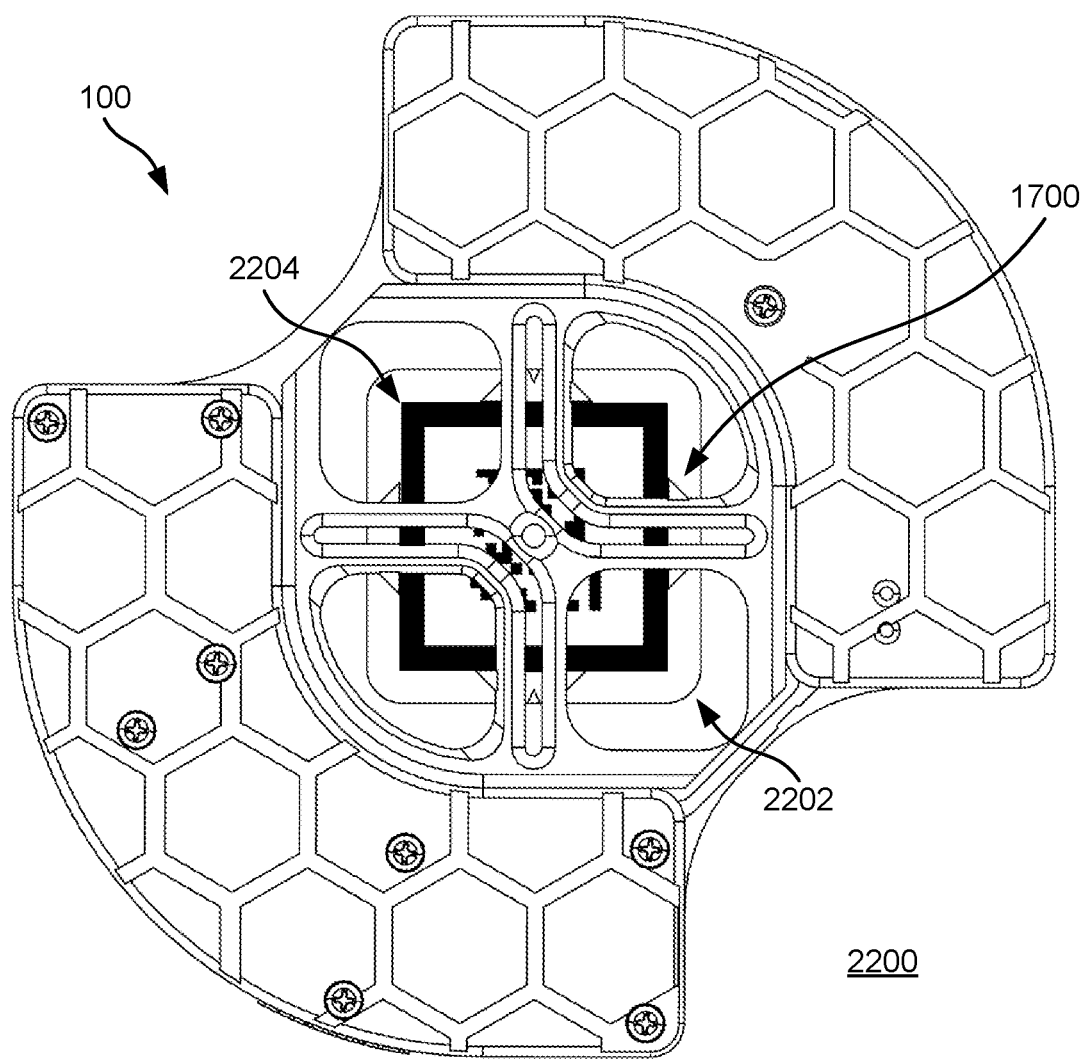
FIG. 22 illustrates an example use of the device of FIGS. 1A and 1B, according to an example of the present disclosure.

FIG. 22 illustrates an example use of the device 100, according to an example of the present disclosure. In some instances, the device 100 may be placed over a fiducial 2202 on a ground surface 2200 to align the device 100 within an environment. For example, the tabs 1700 may be used to align the device 100 on the fiducial 2202. As illustrated, the fiducial 2202 may include a border 2204, for example, and the tabs 1700 may be aligned with the border 2204. For example, the device 100 may be oriented such that the tabs 1700 are aligned with the border 2204. Therein, other fiducials with the environment may be disposed on the ground surface 2200 and along the laser beams 304 emitted by the device 100. In other instances, the device 100 may be aligned on the fiducial 2202 to check or otherwise determine whether the fiducial 2202 is aligned with other fiducials in the environment. The cutouts 400, for example, permit the user to obverse and align the device 100 on the fiducial 2202.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A device, comprising:
   a housing including:
   a first cavity,
   a second cavity,
   a third cavity, and
   a fourth cavity;
   a first laser disposed at least partially within the first cavity, the first laser being configured to output a first laser beam in a first direction;
   a second laser disposed at least partially within the second cavity, the second laser being configured to output a second laser beam in a second direction that is different than the first direction;
   a third laser disposed at least partially within the third cavity, the third laser being configured to output a third laser beam in a third direction that is different than the second direction;
   a fourth laser disposed at least partially within the fourth cavity, the fourth laser being configured to output a fourth laser beam in a fourth direction that is different than the third direction and that is opposite the first direction;
   a first cover coupled to the housing and at least partially enclosing the first cavity;
   a second cover coupled to the housing and at least partially enclosing the second cavity, the third cavity, and the fourth cavity; and
   a body removably coupled to the housing, at a location between the first cover and the second cover, the body including a fiducial configured to be aligned with at least one of the first laser beam, the second laser beam, the third laser beam, or the fourth laser beam.

2. The device of claim 1, further comprising:
   a battery disposed within the first cavity;
   a switch disposed at least partially within the first cavity;
   a printed circuit board (PCB) disposed at least partially within the first cavity; and
   one or more wires that communicatively connect the first laser, the second laser, the third laser, the fourth laser, the battery, the switch, and the PCB.

3. The device of claim 1, further comprising a first coupler disposed at least partially within the second cavity, a second coupler disposed at least partially within the third cavity, and a third coupler disposed at least partially within the fourth cavity, wherein:

the second laser resides at least partially within the first coupler,
the third laser resides at least partially within the second coupler, and
the fourth laser resides at least partially within the third coupler.

4. The device of claim 1, wherein the housing includes a top surface to which the first cover and the second cover are disposed, and a bottom surface opposite the top surface, the bottom surface defining:
a first channel;
a second channel;
a first cutout disposed between the first channel and the third cavity; and
a second cutout disposed between the second channel and the first cavity.

5. The device of claim 1, further comprising:
a first fastener configured to adjust a first orientation of the second laser beam emitted by the second laser;
a second fastener configured to adjust a second orientation of the third laser beam emitted by the third laser; and
a third fastener configured to adjust a third orientation of the fourth laser beam emitted by the fourth laser.

6. A device, comprising:
a housing;
a first coupler coupled to the housing and including a first channel;
a second coupler coupled to the housing and including a second channel;
a first laser configured to output a first laser beam in a first direction;
a second laser disposed at least partially within the first channel of the first coupler and configured to output a second laser beam in a second direction different than the first direction; and
a third laser disposed at least partially within the second channel of the second coupler and configured to output a third laser beam in a third direction different than the second direction.

7. The device of claim 6, further comprising:
a third coupler coupled to the housing and including a third channel; and
a fourth laser disposed at least partially within the third channel of the third coupler and configured to output a fourth laser beam in a fourth direction different than the third direction.

8. The device of claim 7, wherein:
the second laser beam is oriented at 90 degrees from the first laser beam;
the third laser beam is oriented at 45 degrees from the second laser beam; and
the fourth laser beam is oriented at 45 degrees from the third laser beam.

9. The device of claim 6, wherein the housing includes:
a first cavity in which the first laser is at least partially disposed;
a second cavity in which the second laser is at least partially disposed; and
a third cavity in which the third laser is at least partially disposed.

10. The device of claim 9, further comprising:
a first cover coupled to the housing and at least partially enclosing the first cavity; and
a second cover coupled to the housing and at least partially enclosing the second cavity and the third cavity.

11. The device of claim 10, wherein:
the housing includes a first post and a second post;
the second cover includes a third post and a fourth post;
the first coupler includes:
a first passage configured to engage with the first post, and
a second passage configured to engage with the third post; and
the second coupler includes:
a third passage configured to engage with the second post, and
a fourth passage configured to engage with the fourth post.

12. The device of claim 6, further comprising:
a first fastener engaged with a first side of the first coupler;
a first biasing element engaged with a second side of the first coupler;
a second fastener engaged with a third side of the second coupler; and
a second biasing element engaged with a fourth side of the second coupler.

13. The device of claim 6, further comprising:
a switch configured to at least partially control an operation of at least one of the first laser, the second laser, or the third laser;
a battery; and
a printed circuit board.

14. The device of claim 6, wherein the housing includes:
a pocket;
a third channel at least partially aligned with the first direction;
a fourth channel at least partially aligned with at least one of the second direction or the third direction; and
one or more cutouts disposed within the pocket.

15. The device of claim 14, wherein the housing further includes:
one or more first tabs located on a first side of the first channel;
one or more second tabs located on a second side of the first channel;
one or more third tabs located on a third side of the second channel; and
one or more fourth tabs located on a fourth side of the second channel.

16. An apparatus, comprising:
a housing including:
a first cavity,
a second cavity,
a pocket disposed between the first cavity and the second cavity,
a top surface, and
a bottom surface having:
a first channel,
a second channel,
a first cutout,
a second cutout,
a first tab disposed within the first cutout, and
a second tab disposed within the second cutout;
a first laser disposed at least partially within the first cavity;
a second laser disposed at least partially within the second cavity;
a first cover coupled to the top surface and at least partially enclosing the first cavity; and
a second cover coupled to the top surface and at least partially enclosing the second cavity.

17. The apparatus of claim 16, further comprising:
a fastener configured to adjust an orientation of the second laser; and
a biasing element configured to bias the second laser.

18. The apparatus of claim 16, further comprising:
at least one of:
- a third laser disposed at least partially within a third cavity of the housing; or
- a fourth laser disposed at least partially within a fourth cavity of the housing, wherein at least one of:
  the first laser is oriented in a first direction,
  the second laser is oriented in a second direction that is disposed at 90 degrees relative to the first direction,
  the third laser is oriented in a third direction that is disposed at 45 degrees relative to the second direction, or
  the fourth laser is oriented in a fourth direction that is disposed at 180 degrees relative to the first direction.

19. The apparatus of claim 16, further comprising:
a switch disposed at least partially within the first cavity;
a battery disposed within the first cavity; and
a printed circuit board (PCB) disposed within the first cavity, the PCB including a lighting element configured to illuminate according to an operation of the apparatus.

20. The apparatus of claim 16, wherein the housing includes a first post and the second cover includes a second post, further comprising a coupler configured to receive the second laser, the coupler including:
a first receptacle that receives the first post; and
a second receptacle that receives second post.

* * * * *